(12) United States Patent
Nakayama et al.

(10) Patent No.: US 7,617,238 B2
(45) Date of Patent: Nov. 10, 2009

(54) SYSTEM MANAGEMENT METHOD, SYSTEM MANAGEMENT DEVICE, SYSTEM MANAGEMENT PROGRAM, AND STORAGE MEDIUM CONTAINING SYSTEM MANAGEMENT PROGRAM

(75) Inventors: Jouji Nakayama, Musashino (JP); Tetsuya Yamamoto, Adachi-ku (JP); Ken-ichiro Shimokura, Kitatsuru-gun (JP); Tsutomu Yabuuchi, Hachiouji (JP); Kimitaka Endo, Kokubunji (JP); Takashi Imaeda, Choufu (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 304 days.

(21) Appl. No.: 10/564,183

(22) PCT Filed: Jul. 9, 2004

(86) PCT No.: PCT/JP2004/009848

§ 371 (c)(1),
(2), (4) Date: Jan. 11, 2006

(87) PCT Pub. No.: WO2005/006193

PCT Pub. Date: Jan. 20, 2005

(65) Prior Publication Data

US 2006/0190588 A1      Aug. 24, 2006

(30) Foreign Application Priority Data

Jul. 11, 2003    (JP)    ............... 2003-273621

(51) Int. Cl.
*G06F 7/00* (2006.01)
(52) U.S. Cl. .......................................... 707/103; 707/9
(58) Field of Classification Search ........................ None
See application file for complete search history.

(56) References Cited

U.S. PATENT DOCUMENTS

| | | | |
|---|---|---|---|
| 4,620,276 A | 10/1986 | Daniell et al. | |
| 5,555,427 A | 9/1996 | Aoe et al. | |
| 6,044,373 A | 3/2000 | Gladney et al. | |
| 6,058,389 A | 5/2000 | Chandra et al. | |
| 6,275,825 B1 * | 8/2001 | Kobayashi et al. | .............. 707/9 |
| 6,985,938 B2 * | 1/2006 | Ohsaki et al. | ............... 709/223 |
| 2003/0115366 A1 * | 6/2003 | Robinson | ..................... 709/248 |

FOREIGN PATENT DOCUMENTS

EP    0 580 350 A1    1/1994

(Continued)

OTHER PUBLICATIONS

Natusme Sha, "Practical UNIX Handbook", (ISBN4-8163-1654-X), 1994, pp. 31-42.

(Continued)

*Primary Examiner*—Pierre M Vital
*Assistant Examiner*—Truong V Vo
(74) *Attorney, Agent, or Firm*—Oblon, Spivak, McClelland, Maier & Neustadt, L.L.P.

(57) ABSTRACT

A system management method is disclosed for associating a process object and a process with each node in a tree structure, and operating each node based on the tree structure so as to manage the process object and the process, including: registering a registered user that performs operations for a general node corresponding to the process object or for a function node corresponding to the process; setting the function node as a child node of the general node corresponding to the process object for which the process corresponding to the function node should be performed, and setting the general node as a parent node of the function node; setting registered user operation authority for each registered user; and, when execution of the process corresponding to the function node is requested by the registered user, causing the function node to execute the process only when the process is permitted by the registered user operation authority, of the registered user requesting the process, set in the general node that is a parent node of the function node.

15 Claims, 23 Drawing Sheets

FOREIGN PATENT DOCUMENTS

| | | |
|---|---|---|
| EP | 1 009 130 A1 | 6/2000 |
| EP | 1 162 531 A2 | 12/2001 |
| JP | 5-143410 | 6/1993 |
| JP | 10-116293 | 5/1998 |
| JP | 11-24978 | 1/1999 |
| JP | 2000-10930 | 1/2000 |
| JP | 2000-322306 | 11/2000 |
| JP | 2001-297063 | 10/2001 |
| JP | 2002-312212 | 10/2002 |
| JP | 2003-91634 | 3/2003 |
| JP | 2003-141423 | 5/2003 |
| JP | 2003-242033 | 8/2003 |
| WO | WO 00/79758 A2 | 12/2000 |

OTHER PUBLICATIONS

Joji Nakayama, et al., "Information Sharing Platform and Application to remote monitoring and engineering for manufacturing industry", 2-S5-5, IEEJ Industry Applications Society, Aug. 24, 2003, pp. 83-88.

Bob Blakley, "COBRA security handbook to the security of object-oriented system", Nov. 2000, pp. 26-51 and 2 cover pages. (with English translation).

* cited by examiner

FIG.12

| NODE ID | USER ID | NODE ID (FUNCTION) | USER NAME | VIEWING | CHANGE | EXE-CUTION | MANAGE-MENT |
|---|---|---|---|---|---|---|---|
| 101 | 3 | — | UNREGISTERED USER | × | × | × | × |
| 101 | 11 | — | ROBOT OPERATOR | ○ | ○ | ○ | ○ |
| 101 | — | 2 | SYSTEM TIMER | ○ | × | ○ | × |

FIG.13

| NODE ID | PARENT NODE ID | NODE TYPE | NODE NAME |
|---|---|---|---|
| 100 | ... | ... | ... |
| 101 | 100 | GENERAL | LINE A |
| 102 | 101 | GENERAL | ROBOT A |
| 103 | 101 | GENERAL | ROBOT B |
| 104 | 102 | DATA REGISTRATION FUNCTION | DATA REGISTRATION |
| 105 | 102 | ALARM FUNCTION | ALARM |
| 106 | 102 | WARNING LIGHT FUNCTION | WARNING LIGHT |
| 107 | ... | ... | ... |

FIG.14

| TIME | NODE ID | DATA TYPE | CHANNEL | VALUE |
|---|---|---|---|---|
| 2001/01/01 00:00:00:001 | 104 | VALUE | SHOULDER JOINT ANGLE | 10 |
| 2001/01/01 00:00:00:001 | 104 | VALUE | ARM JOINT ANGLE | 20 |
| ... | 104 | VALUE | ... | ... |

FIG.15

| NODE ID | USER ID | NODE ID (FUNCTION) | USER NAME | VIEWING | CHANGE | EXECUTION | MANAGEMENT |
|---|---|---|---|---|---|---|---|
| 101 | 3 | — | UNREGISTERED USER | × | × | × | × |
| 101 | 11 | — | ROBOT OPERATOR | ○ | ○ | ○ | ○ |
| 101 | 12 | — | ROBOT MAKER SUPPORT | ○ | × | × | × |
| 101 | — | 2 | SYSTEM TIMER | ○ | × | ○ | × |

FIG.16

| NODE ID | USER ID | NODE ID (FUNCTION) | USER NAME/ NODE NAME | VIEWING | CHANGE | EXE- CUTION | MANAGE- MENT |
|---|---|---|---|---|---|---|---|
| 102 | 3 | — | UNREGISTERED USER | ○ | × | × | × |
| 102 | 11 | — | ROBOT OPERATOR | ○ | ○ | ○ | ○ |
| 102 | 12 | — | ROBOT MAKER SUPPORT | ○ | × | ○ | × |
| 102 | 13 | — | ROBOT DATA TRANSMISSION APPARATUS MANAGER | ○ | ○ | ○ | × |
| 102 | — | 2 | SYSTEM TIMER | ○ | × | ○ | × |
| 102 | — | 105 | ALARM | ○ | × | ○ | × |
| 102 | — | 106 | WARNING LIGHT | ○ | × | ○ | × |
| 102 | — | 9999 | UNREGISTRATION FUNCTION | ○ | × | × | × |

SYSTEM MANAGEMENT METHOD, SYSTEM MANAGEMENT DEVICE, SYSTEM MANAGEMENT PROGRAM, AND STORAGE MEDIUM CONTAINING SYSTEM MANAGEMENT PROGRAM

TECHNICAL FIELD

The present invention relates to a technology for performing system management. More particularly, the present invention relates to a technology of system management for performing management for management objects such as an apparatus and the like and a whole system formed by the management objects and for performing management of users who use the system.

BACKGROUND ART

Directory management in Unix can be taken as a representative example of a conventional system having a tree structure. The directory structure of Unix is configured as a structure that is hierarchically arranged by directories from a root node. In the structure, when each user has files such as documents and programs and uses them proactively, the documents and the programs can be shared with other users.

In this case, each of the directories and the files can be provided with attribute settings by users and groups, and can be provided with authority of reading, writing and execution for each of the owner, group and other users (refer to document 1 "Practical UNIX handbook", Natsume sha, 1994, p 31-42 (ISBN4-8163-1654-X)).

DISCLOSURE OF THE INVENTION

Problem to be Solved by the Invention

In the Unix directory management, it is assumed that resources are shared when each user proactively uses the directories and the files, but it is not assumed that sharing is initially performed for each part of the whole system. This is indicated by the user management method, for example. In the user management method, if a user is registered, the user can use the whole system. However, as to authority management, only group management is performed except for the owner of the file and the directory. Therefore, it is difficult to manage authority of user for each directory.

In addition, as to the authority, since the authority is applied in order from the root directory, it is necessary to provide authority to an upper directory in order to provide authority to some lower directories. However, according to such mechanism, the structure of the whole system should be disclosed. Thus, there is a problem in that concealment ability is lost due to information sharing especially for a management system that deals with management concepts such as organization and real objects.

In addition, for the management system, since very complicated work is necessary and information amount increases in order to perform authority management of users for each file or for each directory or the like, there is a problem in that the system becomes complicated.

Next, as to message exchange, there is no limit for security in general message exchange systems. Thus, such message exchange systems are not applicable for realizing message exchange in the management system. Therefore, in the past, it has been necessary to establish a message system based on authority management of the user and the like.

Further, since process functions, for each management object, provided by the management system are developed individually for each function, there are problems in that the system becomes complicated, and along with it, management such as setting of user management authority for each function becomes complicated.

The present invention is contrived for solving the above-mentioned problems, and the object of the present invention is to provide a system management technology, in the management system, for enabling the management system to perform natural and flexible authority management according to the tree structure by managing the management object and function by associating each management object and function with a node in the tree structure, and by registering the user to the node, and setting authority to the user.

In addition, an object of the present invention is to provide a system management technology that can provide advanced function realizing means based on cooperation of simple functions by executing functions based on sending and receiving of messages, and based on events.

In addition, an object of the present invention is to provide system management technology for providing mechanisms for asynchronous process for efficient message processing, message receive management based on access list for security improvement, and automatic execution/cooperation based on authority setting for nodes.

Means for Solving the Problem

The above object is achieved by a system management method for associating at least a process object and at least a process that should be executed for each process object with each node in a tree structure, and operating each node based on the tree structure so as to manage the process object and the process, including:

a user registration step of performing a process for registering a user ID to be uniquely assigned to each registered user that performs operations for a general node corresponding to the process object or for a function node corresponding to the process, and storing the user ID in a storing means;

a node number assigning step of uniquely assigning a node number to each of the general node and the function node, and storing the node number in the storing means by associating the node number with the general node or the function node;

a node setting step of setting the function node as a child node of the general node corresponding to the process object for which the process corresponding to the function node should be performed, and setting the general node as a parent node of the function node, and storing information of the set child node into the storing means by associating the information with the general node that is the parent node;

an authority setting step of setting registered user operation authority for each registered user for each of the general nodes, and storing the registered user operation authority into the storing means by associating the registered user operation authority with the general node; and a process execution step of, when execution of the process corresponding to the function node is requested by the registered user, causing the function node to execute the process only when the process is permitted by the registered user operation authority, of the registered user requesting the process, set in the general node that is a parent node of the function node.

The system management method may include:

in the authority setting step, setting, for each of the general node, non-registered user operation authority that is operation authority of a non-registered user that is not registered by the user registration step, and storing the non-registered user operation authority in the storing means by associating the non-registered user operation authority with the general node; and in the process execution step, when execution of the process corresponding to the function node is requested by the non-registered user, causing the function node to execute the process only when the process is permitted by the non-registered user operation authority set for the general node that is the parent node of the function node.

Also, the system management method may include:

in the authority setting step, further setting, for each of the general nodes, function node operation authority for each function node, and storing the function node operation authority in the storing means by associating the function node operation authority with the general node; and in the process execution step, when execution of the process corresponding to the function node is requested by any of function nodes, causing the function node to execute the process only when the process is permitted by the function node operation authority, of the function node that requests the process, set for the general node that is the parent node of the function node.

In addition, the system management method may include:

in a message sending step of sending a message in which at least any one of the function node or the user is a sending origination and at least any one of function nodes is a destination, detecting presence or absence of execution of a predetermined event process at the sending origination, and sending the message received from the sending origination according to the detection result; and in a receiving step of receiving the message to the destination, when receiving the message, sending a message having the destination as a sending origination to the destination or causing the destination to execute a predetermined event process according to a condition that is set beforehand.

The system management method may include, in the message sending step and the message receiving step, sending and receiving an asynchronous message using a queue that temporarily stores the message.

In addition, the system management method may include, in the message sending step and the message receiving step, sending or receiving the asynchronous message according to a priority set for each message when sending or receiving the asynchronous message.

In addition, the system management method may include, in the message receiving step, when receiving the message, determining whether the message is a recursive message from the own node based on sending origination information of the message, and recursively performing message sending or the event process based on the sending origination information of the message when the message is the recursive message from the own node.

Further, the system management method may include, in the message receiving step, receiving only a message sent from a sending origination set in a predetermined access list.

In addition, according to the present invention, a system management apparatus applicable for executing the system management method, a program for causing a computer to execute each step of the system management method, and a computer readable medium storing the program can be provided.

EFFECT OF THE INVENTION

According to the present invention, the apparatus that is the management object and the management unit are set as the general node in the tree structure managed by a computer, and a program operated on information related to the general node or an apparatus etc. that is the management object is set as the function node. Then, the general node is explicitly associated with the function node, and authority is set for each user registered for each node. Accordingly, a management system can be provided in which operable objects and range are clarified and safe and efficient management is available.

In addition, by providing message sending and receiving function for connecting function nodes with each other, the function of each function node can be limited to a very simple function, so that system construction becomes easy, and at the same time, it becomes possible to perform more advanced and complicated processes by combining the simple function nodes. Further, it becomes possible to use one piece of information for various process flows.

In addition, by performing the before-mentioned message sending and receiving asynchronously, work load of the whole system can be decreased and resources can be used efficiently.

In addition, by recursively performing message sending and event process, process range of each function can be extended and flexible functions can be realized.

In addition, by setting the access list for the user and the node, the message can be sent and received without disclosing the configuration of the whole system to the user, so that security can be improved.

BRIEF DESCRIPTION OF THE DRAWINGS

FIG. 12 is an example of a table showing information of a node in an embodiment of the present invention;

FIG. 13 is an example of a table showing information of a node in an embodiment of the present invention;

FIG. 14 is an example of a table showing information of a node in an embodiment of the present invention;

FIG. 15 is an example of a table showing information of a node in an embodiment of the present invention;

FIG. 16 is an example of a table showing information of a node in an embodiment of the present invention;

DESCRIPTION OF REFERENCE SIGNS

Figure 1:
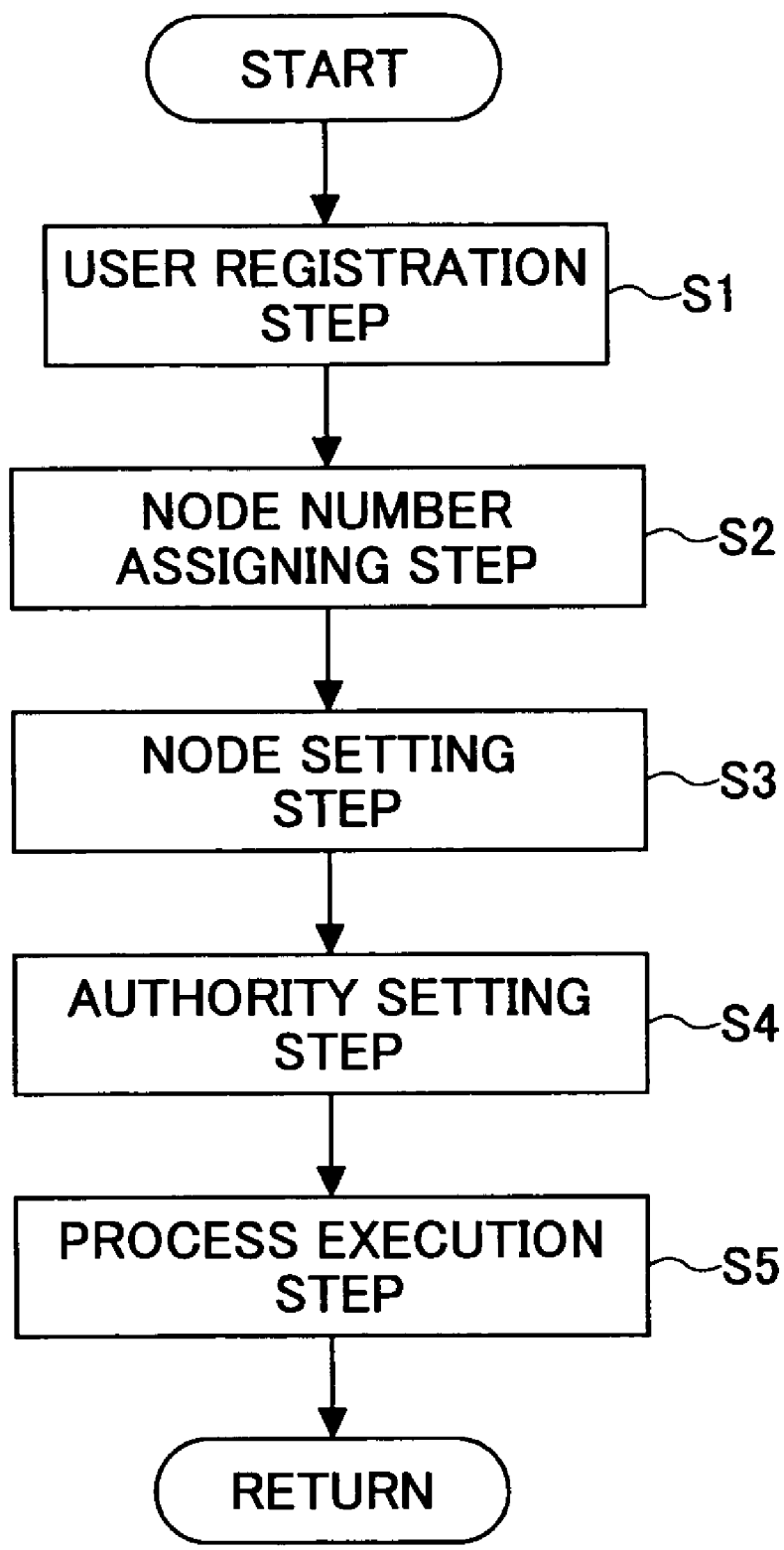
FIG. 1 is a diagram for explaining an embodiment of the present invention.

10 network
20 user/manufacturing apparatus etc.
100 system management apparatus
110 storing means
111 node tree/user information database
112 management information database
120 user management unit
121 user information registration means, user information registration unit
122 user number assigning unit
123 user operation authority management unit
130 message management unit
131 message management unit
132 queue management unit
133 access list setting unit
134 message receiving unit
135 message sending unit
136 event trigger setting unit
137 priority setting unit
138 recurrence process detection unit 138
139 process execution means, process execution unit
140 node information management unit
141 node information registration unit
142 node number assigning unit
143 node operation authority management unit
144 authority setting unit 144
151 tree management unit
152 access management interface
153 authority determination unit
160 interface
170 event management unit
180 system timer

PREFERRED EMBODIMENT FOR CARRYING OUT THE INVENTION

In the following, embodiments of the present invention are described with reference to figures. First, a general outline is described with reference to FIGS. 1 and 2. FIG. 1 is a diagram for explaining a system management method of an embodiment of the present invention.

The system management method is for associating at least a process object and at least a process that should be executed for each process object with each node in a tree structure, and operating each node based on the tree structure so as to manage the process object and the process, including:

a user registration step (step 1) of performing a process for registering a user ID to be uniquely assigned to each registered user that performs operations for a general node corresponding to the process object or for a function node corresponding to the process, and storing the user ID in a storing means;

a node number assigning step (step 2) of uniquely assigning a node number to each of the general node and the function node, and storing the node number in the storing means by associating the node number with the general node or the function node;

a node setting step (step 3) of setting the function node as a child node of the general node corresponding to the process object for which the process corresponding to the function node should be performed, and setting the general node as a parent node of the function node, and storing information of the set child node into the storing means by associating the information with the general node that is the parent node;

an authority setting step (step 4) of setting registered user operation authority for each registered user for each of the general nodes, and storing the registered user operation authority into the storing means by associating the registered user operation authority with the general node; and a process execution step (step 5) of, when execution of the process corresponding to the function node is requested by the registered user, causing the function node to execute the process only when the process is permitted by the registered user operation authority, of the registered user requesting the process, set in the general node that is a parent node of the function node.

Figure 2:
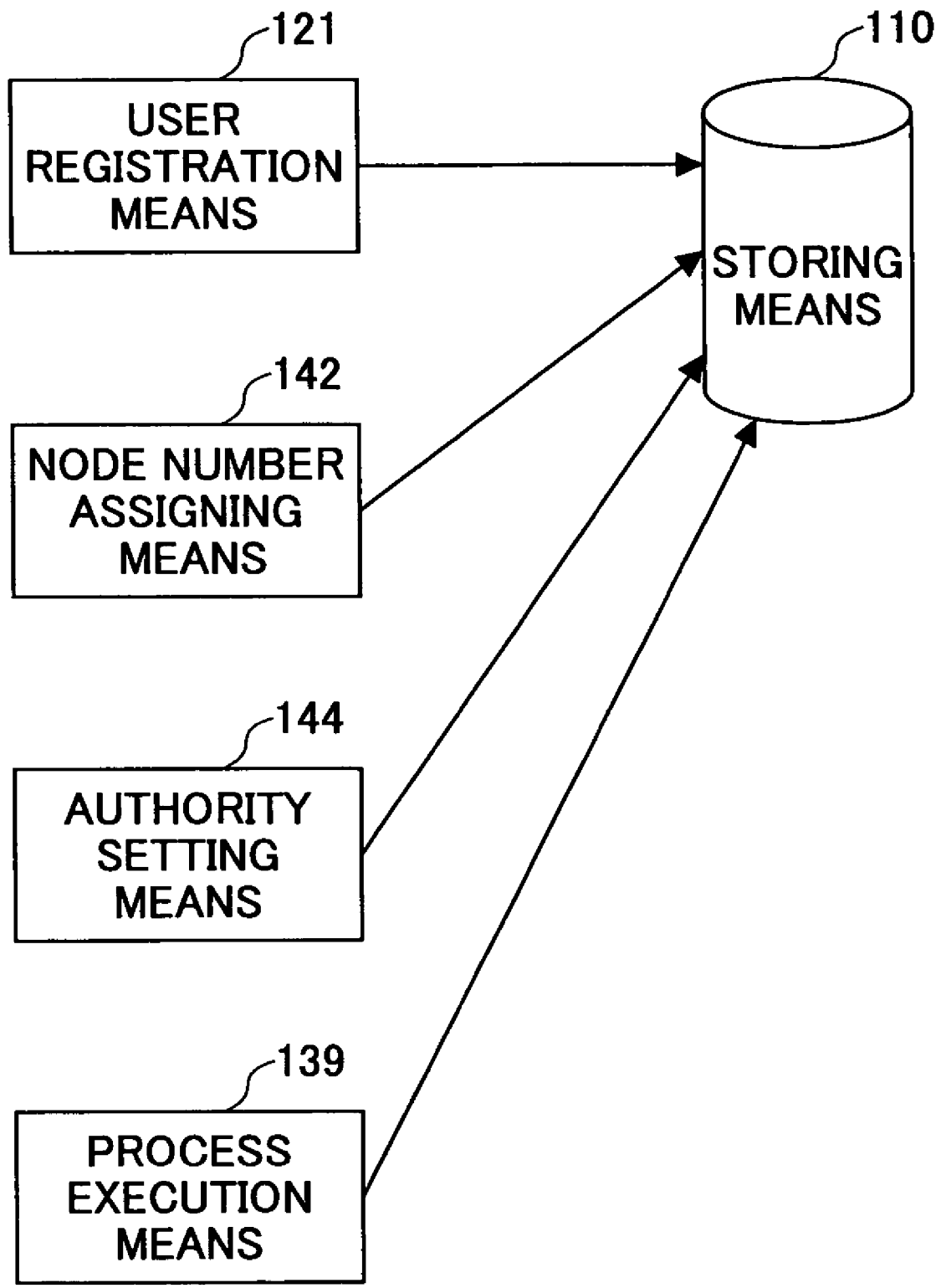
FIG. 2 is a diagram for explaining an embodiment of the present invention.

FIG. 2 shows a block diagram showing a general outline of the system management apparatus of an embodiment of the present invention.

The system management apparatus is an apparatus for associating at least a process object and at least a process that should be executed for each process object with each node in a tree structure, and operating each node based on the tree structure so as to manage the process object and the process, comprising:

storing means 110 for storing each piece of information of a general node corresponding to the process object, a function node corresponding to the process, and a registered user for operating the general node or the function node;

user registration means 121 for performing a process for registering a user ID to be uniquely assigned to each registered user and storing the user ID in the storing means 110;

node number assigning means 142 for uniquely assigning a node number to each of the general node and the function node, and storing the node number in the storing means 110 by associating the node number with the general node or the function node;

node setting means 141 for setting the function node as a child node of the general node corresponding to the process object for which the process corresponding to the function node should be performed, and setting the general node as a parent node of the function node, and storing information of the set child node into the storing means 110 by associating the information with the general node that is the parent node;

authority setting means 144 for setting registered user operation authority for each registered user for each of the general nodes, and storing the registered user operation authority into the storing means 110 by associating the registered user operation authority with the general node; and process execution means 139 for, when execution of the process corresponding to the function node is requested by the registered user, causing the function node to execute the process only when the process is permitted by the registered user operation authority, of the registered user requesting the process, set in the general node that is a parent node of the function node.

Figure 3:
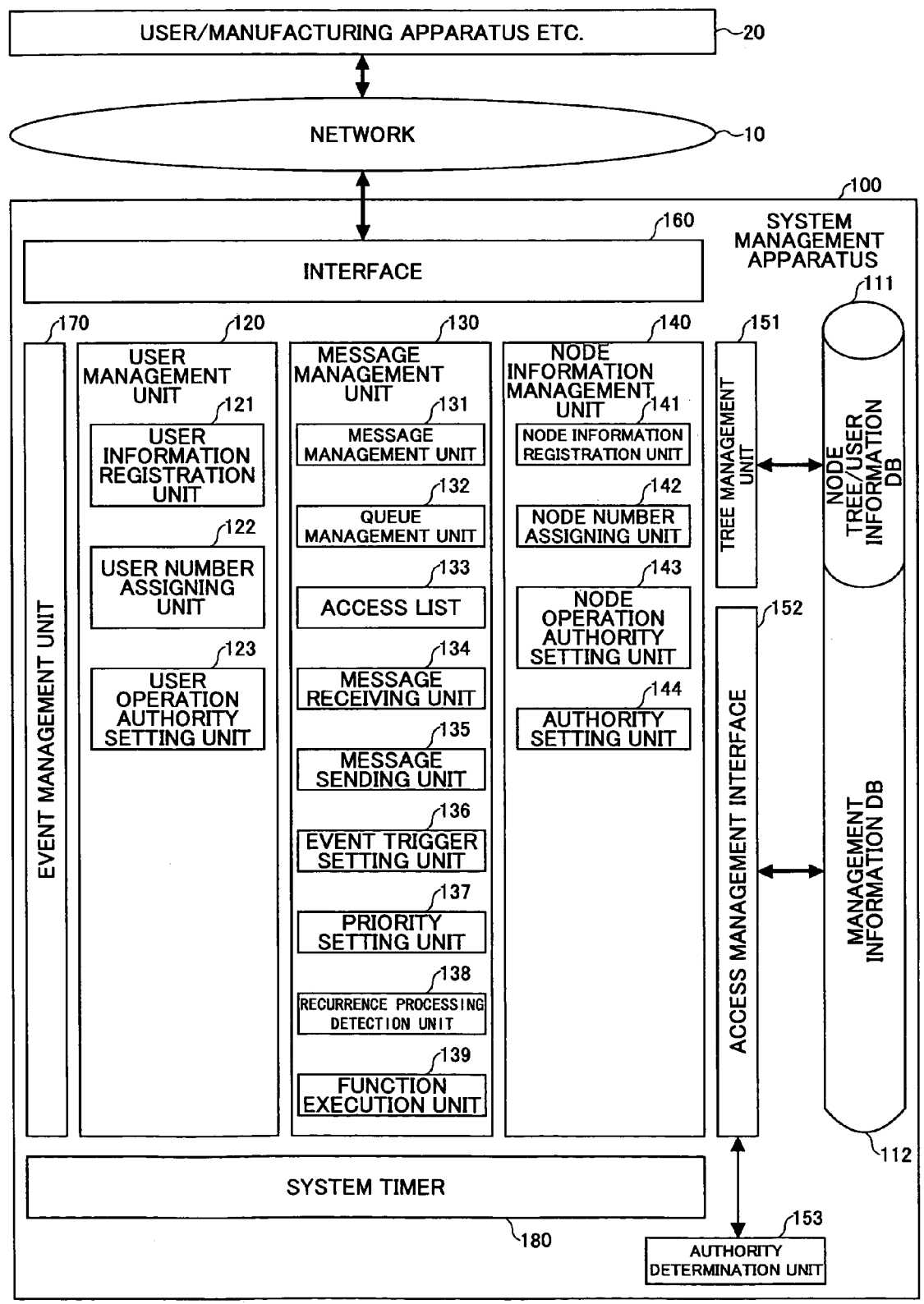
FIG. 3 is a block diagram of a system in an embodiment of the present invention.

In the following, the embodiment of the present invention is described in detail. FIG. 3 shows a system configuration of the embodiment of the present invention.

The system shown in the figure includes an apparatus 20, connected to a network 10, such as a user/a manufacturing apparatus etc., and a system management apparatus 100.

The system management apparatus 100 includes an interface 160, a system timer 180, an event management unit 170, a tree management unit 151, an access management interface 152, a node tree/user information database 111, a management information database 112, a tree management unit 151, an access management interface 152, an authority determination unit 153, a user management unit 120, a message management unit 130 and a node information management unit 140.

The interface 160 performs interactions with the user/apparatus 20. The system timer 180 performs time management and notification in the system. The event management unit 170 performs management of events arising in the user or apparatus 20 and the system. The tree management unit 151 manages the node tree and user information and the like set in the system. By the way, the "user" means a computer used by the user.

The access management interface 152 performs interaction between the system and the management information database 112 that stores information sent from the user/apparatus 20. The authority determination unit 153 determines permit/deny for accessing a node. The node tree/user information database 111 manages the node and user information. The management information database 112 stores and manages information sent from the apparatus 20 and the like.

The user management unit 120 includes a user information registration unit 121 for registering user information, a user number assigning unit 122 for managing the user number to be assigned when performing user registration, a user operation authority management unit 123 for performing management of authority set beforehand when executing function by a message.

The message management unit 130 includes a message management unit 131 for managing sending and receiving of the message, a queue management unit 132 for performing management of a queue when performing asynchronous sending of the message, an access list setting unit 133 for managing an access list used for sending and receiving of the message, a message receiving unit 134 for receiving the message, a message sending unit 135 for sending the message, an event trigger setting unit 136 for setting an event trigger used when sending and receiving the message, a priority setting unit 137 for setting priority on menage sending and receiving, a recurrence process detection unit 138 for detecting recursive process (message group to its own system) by a message, and a function execution unit 138 for executing a designated process in message sending and receiving.

The node information management unit 140 includes a node information registration unit 141 for registering node information, a node number assigning unit 142 for managing node numbers to be assigned when performing user registration, a node operation authority management unit 143 for managing authority that is set beforehand when executing a function by a message, and an authority setting unit 144 for setting authority of the user in the node.

In the following, concrete operation in the above-mentioned configuration is described.

Figure 4:
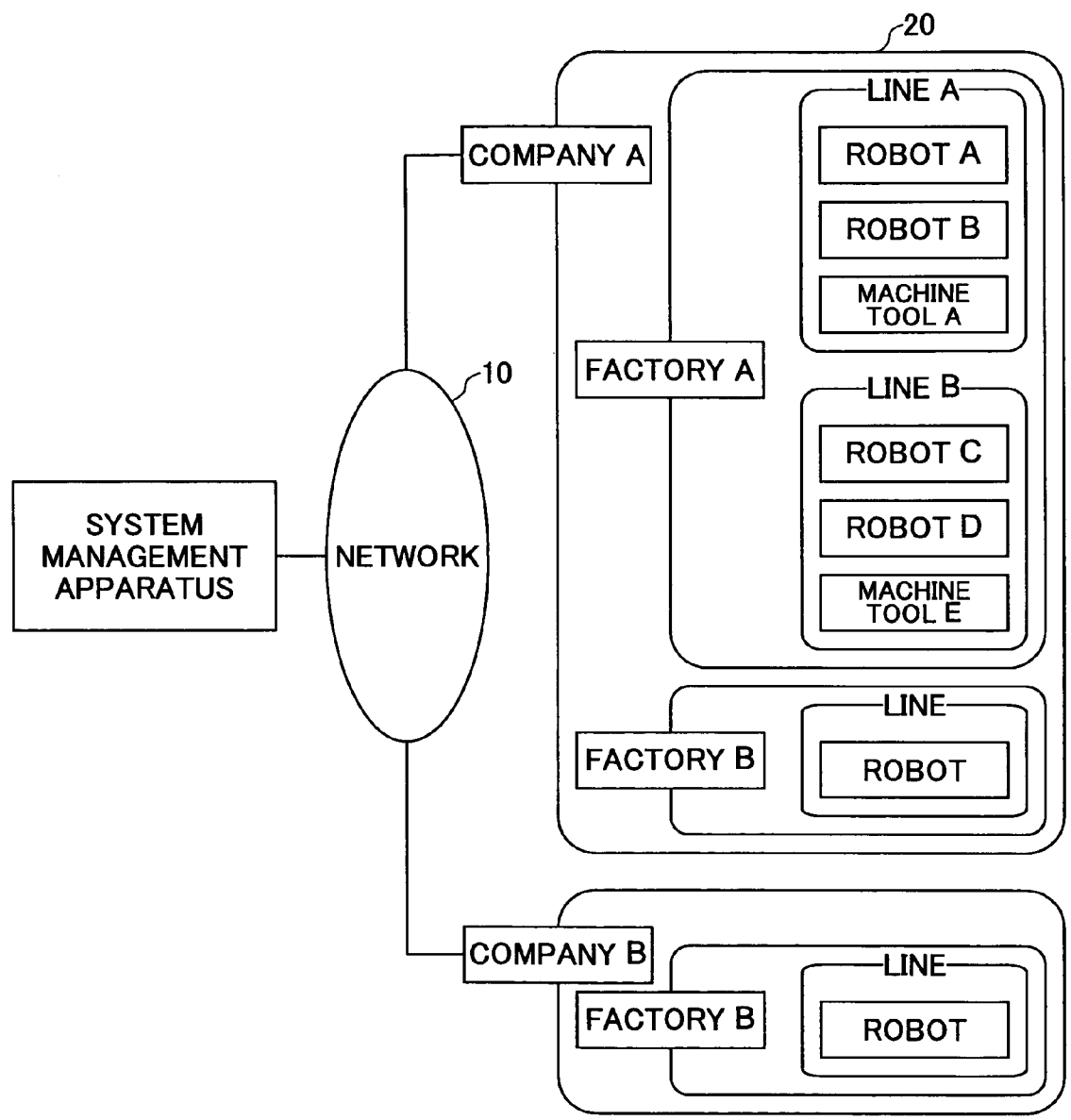
FIG. 4 is a diagram showing a management system use example in an embodiment of the present invention.

FIG. 4 shows a management system usage example in an embodiment of the present invention. In this embodiment, the present invention is used for management of resources such as apparatuses in an organization of a company and the like. The example of FIG. 4 shows that factories in companies, lines in the factories, robots and machine tools in the lines are managed hierarchically (like a tree).

First, management of nodes that is the basic feature of the present invention is described.

The node is classified as a general node corresponding to an apparatus that is a management, and a function node for performing a process for the apparatus or a process for data obtained from the apparatus. Each of the general node and the function node is managed by a node ID.

The node ID starts from 1, and is generated by adding 1 to the node ID each time when a node is added. By assigning the node ID uniquely, it becomes possible to specify a node uniquely.

In this system, the node information management unit 140 performs management of the node ID using a table of the node tree/user information database 111.

Figure 5:
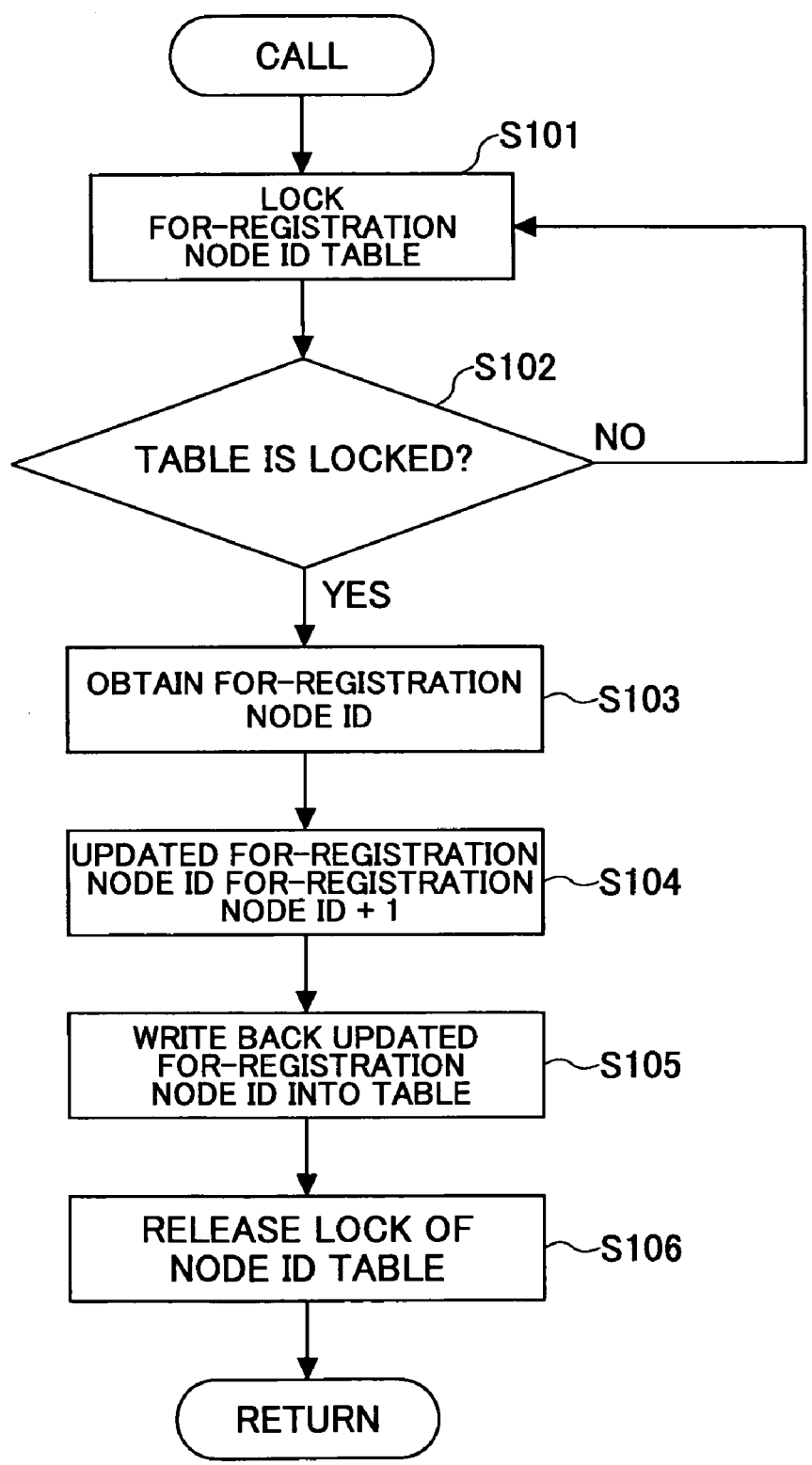
FIG. 5 is a flowchart showing a node ID assignment operation n an embodiment of the present invention.

FIG. 5 shows an operation of the system management apparatus for assigning the node ID.

The node information management unit 140 locks the for-registration node ID table of the node tree/user information database 111 (step 101). When the table is locked (step 102), the node information management unit 140 obtains a for-registration node ID (step 103). Then, the node number assigning unit 142 adds 1 to the node ID to obtain an updated for-registration node ID (step 104). The node information registration unit 141 writes the updated for-registration node ID back to the table (step 105), and releases the lock of the node ID table (step 106).

Figure 6:
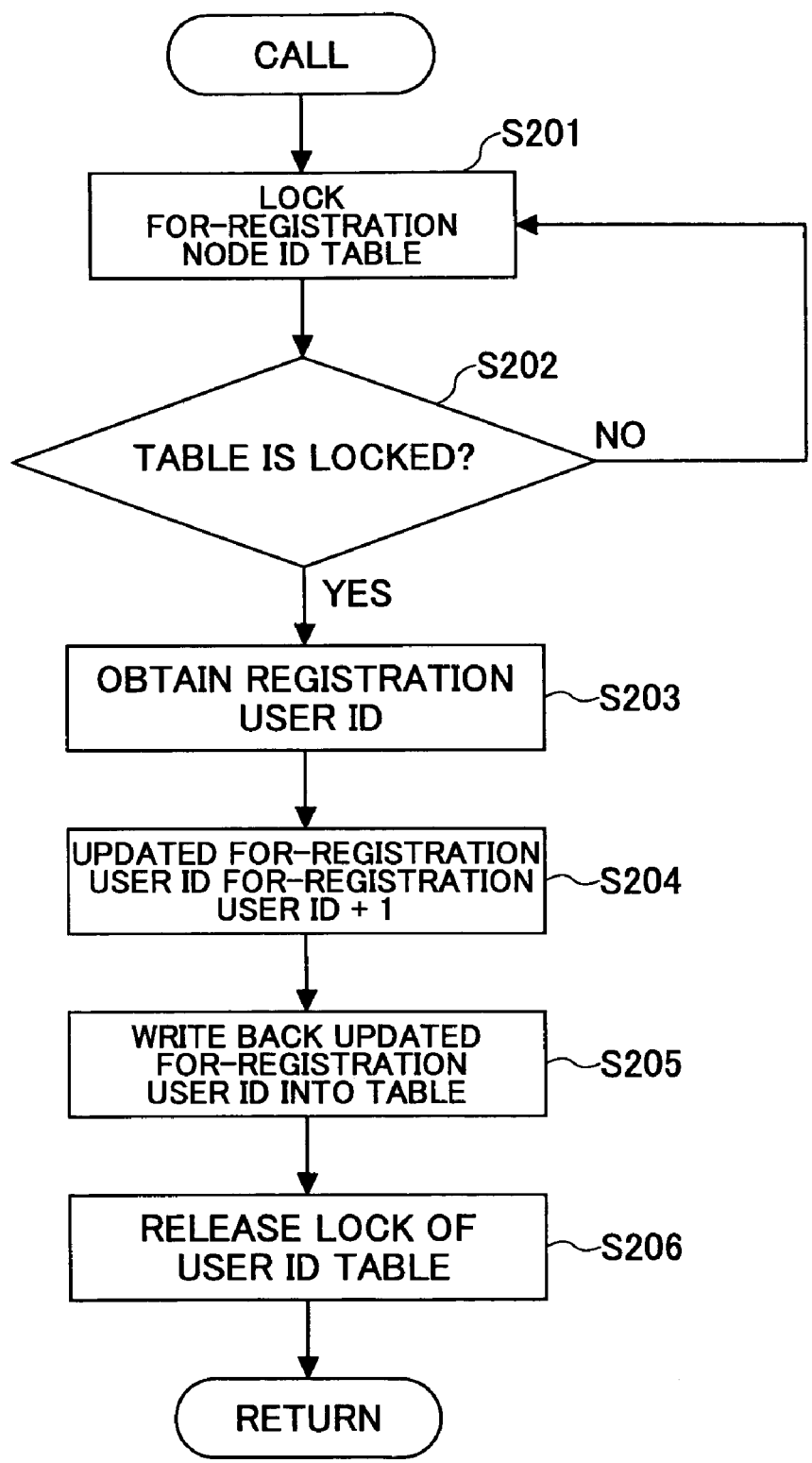
FIG. 6 is a flowchart showing a node ID assignment operation n an embodiment of the present invention.

Also as to a user, in the same way as the node ID, the user is managed by a user ID when the user is newly registered. FIG. 6 shows the operation for user registration.

The for-registration user ID table in the node tree/user information database 111 is locked (step 201). When the table is locked (step 202), the user number assigning unit 122 in the user management unit 120 obtains a for-registration user ID (step 203), and add 1 to the for-registration user ID to obtain an updated for-registration user ID (step 204). The user information registration unit writes the updated for-registration user ID back to the table (step 205), and releases the lock of the for-registration user ID (step 206).

In addition, in this system, for the sake of simplicity, node names and user names that already exist at the time of registration are checked such that registration by redundant names is not permitted in order to clarify one-to-one correspondence between the node ID and the node name, and between the node ID and the user name.

In order to delete a node safely, deletion is performed after checking a precondition that there is no node under the node to be deleted and that any user other than the user to perform deletion is not registered on the node to be deleted, for example. However, the process of checking of the subordinate node or registered user can be omitted.

Next, user registration process is described. The user registration process is performed, by a registered user (a managing user is an example of the registered user) who registers a user, by inputting information of a user to be registered.

As to the process for registration, in addition to a method for performing user registration for each node for which the user wants to have authority, there is a method for specifying a top-level node to which the user is desired to be registered.

In the case when using the method for specifying the top-level node, the registered user can perform, for nodes for which the registered user has management authority, registration and authority setting for a user to be registered within a limit of authority of the registered user. When a node for which registration is to be performed and authority of the user to be registered are specified by the registered user, the registered user searches the node correspondence table for child nodes for which the registered user can perform registration, and makes setting for each child node.

Also in a case when changing user authority and deleting a user, a method for specifying a node, and performing authority change and deletion process for authority of a registered user of the node can be applied. In addition, a process method for performing authority change and deletion process for all nodes under the specified node can be applied.

Figure 7:
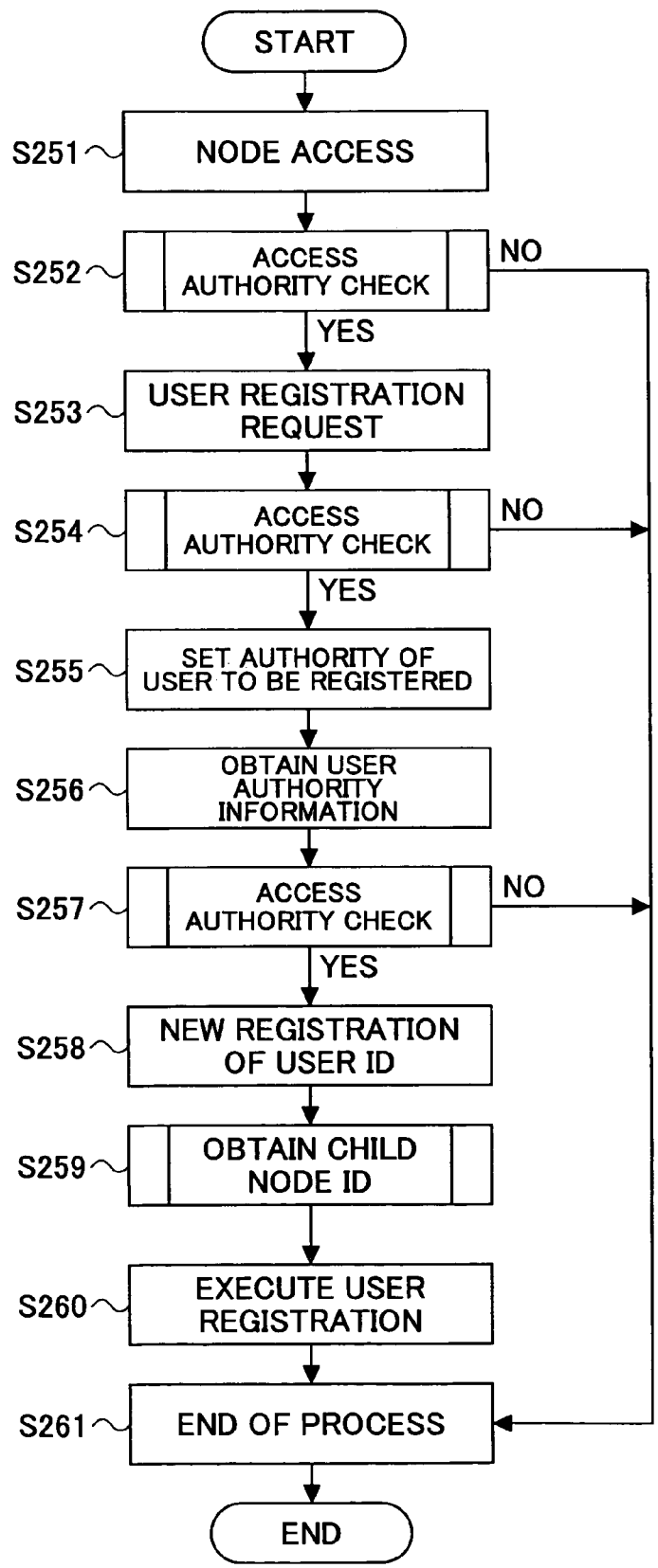
FIG. 7 is a flowchart showing a flow of a user registration process in an embodiment of the present invention.

The flow of this user registration process is described with reference to FIG. 7.

First, the managing user accesses a node (under-registration node) on which user registration is to be performed (step 251). Then, the system management apparatus checks whether the managing user has access authority for the under-registration node (step 252). When the managing user has the access authority, a user registration request is sent to the under-registration node (step 253). Next, presence or absence of the registration (management) authority of the managing user at the under-registration node is checked (step 254). When the managing-user has the authority, the managing user sets authority of the user to be registered (step 255). The system management apparatus obtains the user authority information (step 256), compares authority of the managing user with authority of the user to be registered so as to check whether the authority of the user to be registered is within a limit of the authority of the managing user (step 257), if the authority is within the limit of the authority of the managing user, the user ID of the user to be registered is newly registered at the under-registration node (step 258). Next, the system management apparatus obtains child node IDs, under the under-registration node, accessible by the managing user (step 259), so that user registration is performed (recursively) for each child node by the same procedure (step 260), and an end process is performed (step 261). As to change and deletion of authority, similar steps are performed.

Figure 8:
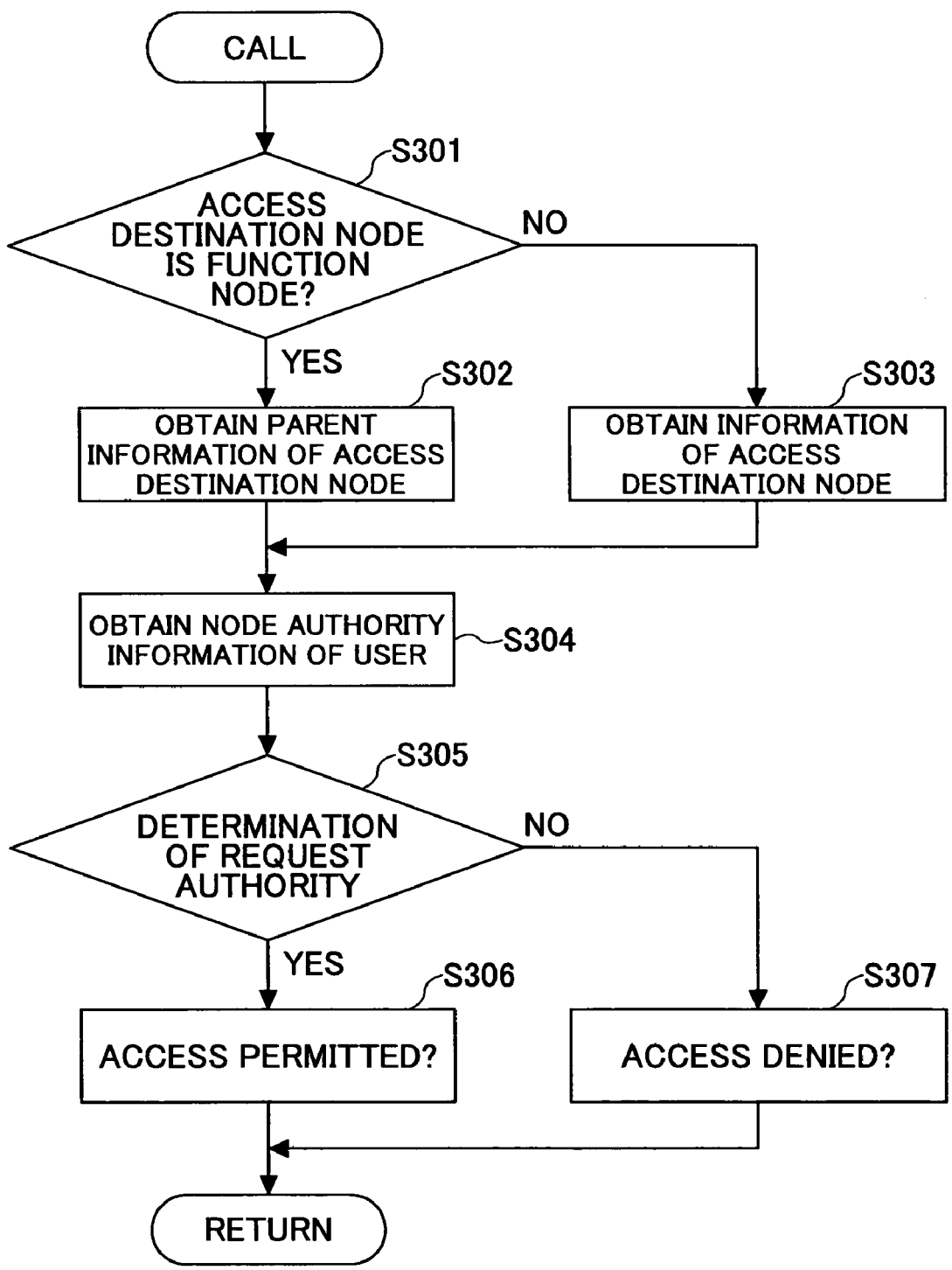
FIG. 8 is a flowchart of an access right check operation in an embodiment of the present invention.

Next, management of access authority in the general node and the function node is described. FIG. 8 shows a flow of access authority check that is basic for the process. The flow described in the following is a flow for performing check of access authority of an access origination user for an access destination node in a case when the access origination user accesses the access destination node.

When the access destination node is a general node (No in step 301), the authority setting unit 144 obtains a node ID of the general node that is the access destination node and user ID information registered for the node ID (step 303). When the access destination node is a function node (Yes in step 301), the authority setting unit 144 obtains, based on the function node ID, a node ID of a general node that is a parent node and user ID information registered for the node ID (step 302).

When the user ID of the access origination user is included in the obtained user ID information, next, authority information of the access origination user ID at the node is obtained (step 304). Then, the authority determination unit 153 determines presence or absence of access authority based on request information for the access destination node and authority information set for the user of the general node (step 305), so that permit/deny for process is determined (steps 306 and 307).

Figure 9:
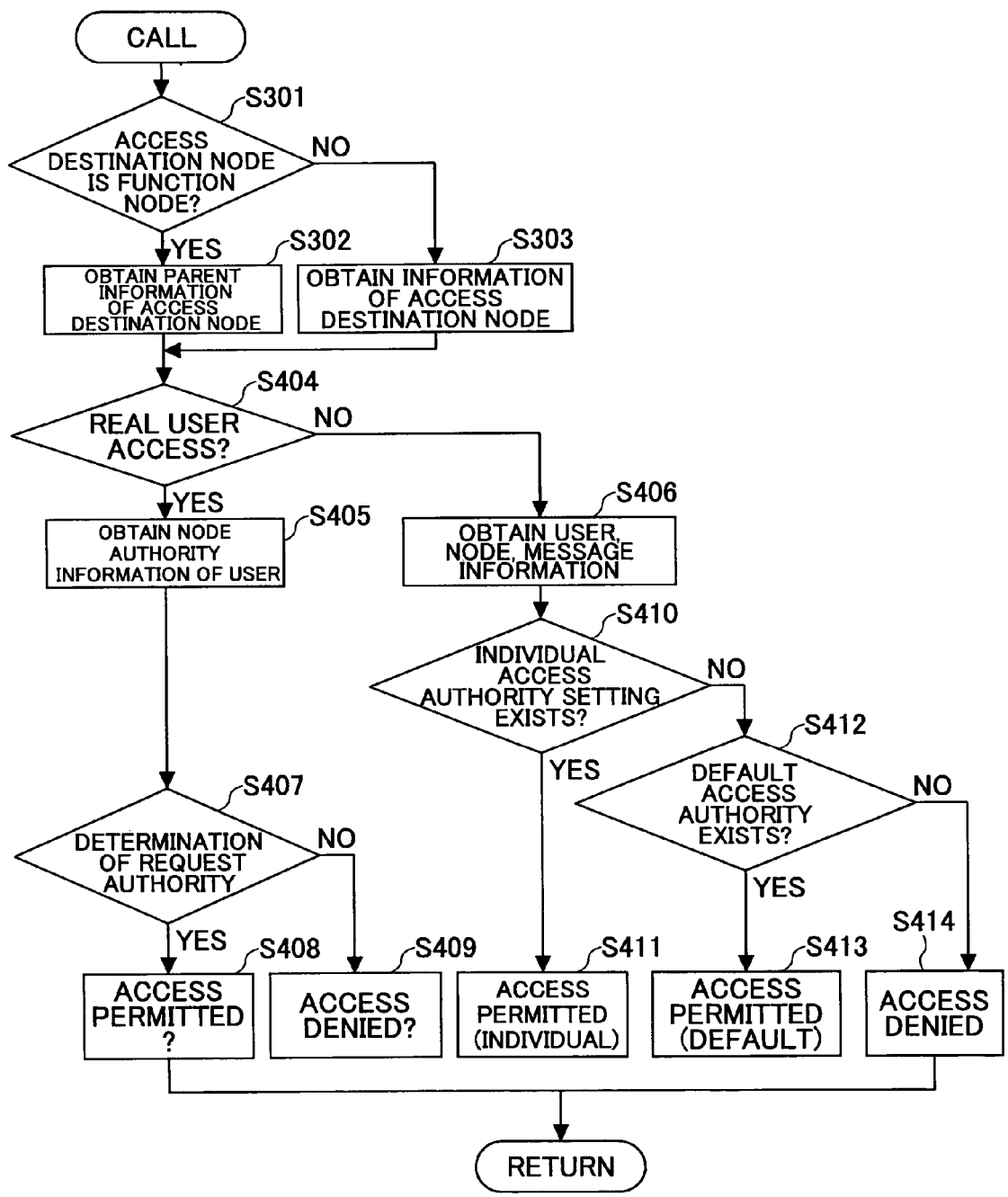
FIG. 9 is a flowchart of an extended access right check operation in an embodiment of the present invention.

Access by the user is described so far. FIG. 9 shows an example of extended access authority check assuming that the node performs automatic processes. In the following, access from a function node to another function node is mainly described. In this example, in step 302, it is determined whether an access origination function node has access authority for an access destination function node, in the same as the case of the access authority of the user, based on authority information on the access origination function node, wherein the authority information is registered for a general node that is a parent node of the access destination node (that is requested to perform execution process). Then, it is determined whether the access is real access by the user or virtual access by the function node based on user authority (step 404).

In step 406, information of the function node and the like is obtained, and the processes are performed (steps 408, 409, 411, 413 and 414) according to authority setting individually set to the access destination node beforehand (step 410) and default authority setting (step 412). By the way, the individual authority is authority setting information being associated with the function node described in FIG. 16 that is described later. In addition, in the example of FIG. 16, "viewing" is set as default authority for non-registration function node. In the way as mentioned above, more flexible processing becomes available.

Figure 10:
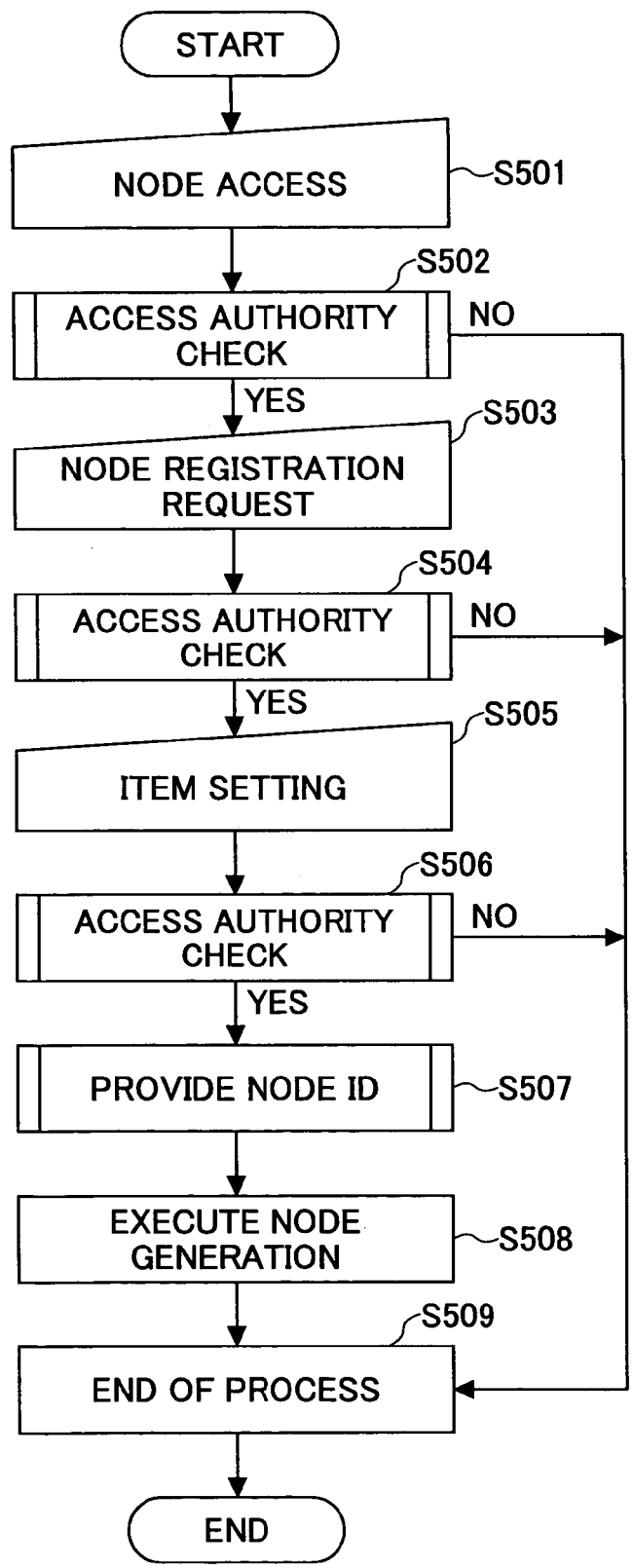
FIG. 10 is a flowchart of node registration in an embodiment of the present invention.

Next, as an example, FIG. 10 shows an example for performing node registration process based on access authority assuming that four authorities can be set for each node.

In this example, authorities that can be set are as follows:

Viewing: authority for referring to node itself;

Change: authority for changing data registered in the node;

Execution: authority for causing the function node to execute a process;

Management: authority for registering/adding/deleting a user for a general node, and for registering/adding/deleting a general or function node.

When the user accesses the node via the access management interface 152 (step 501), the authority determination unit 153 obtains a node ID of the access destination node, first, then, the authority determination unit 153 searches for a user ID registered in the node ID based on the user ID of the user who performs this access, so as to determine presence or absence of access authority (viewing authority) to the access destination node by the user who performs the access (step 502).

Next, when a request for registering a new function node is sent to the access destination node (step 503), the authority determination unit 153 checks management authority of the request from the user at the access destination node based on the user ID of the user and the node ID of the access destination node (step 504). When the management authority exists, items for node registration are set and registration is executed (step 505). Then, again, the registration item information is compared with the management authority of the user at the node to check whether the authority to be registered is within the limit of the management authority (step 506). After that, the node is actually generated by the node number assigning unit 142 and the node information registration unit 141 (steps 507-509).

Figure 11:
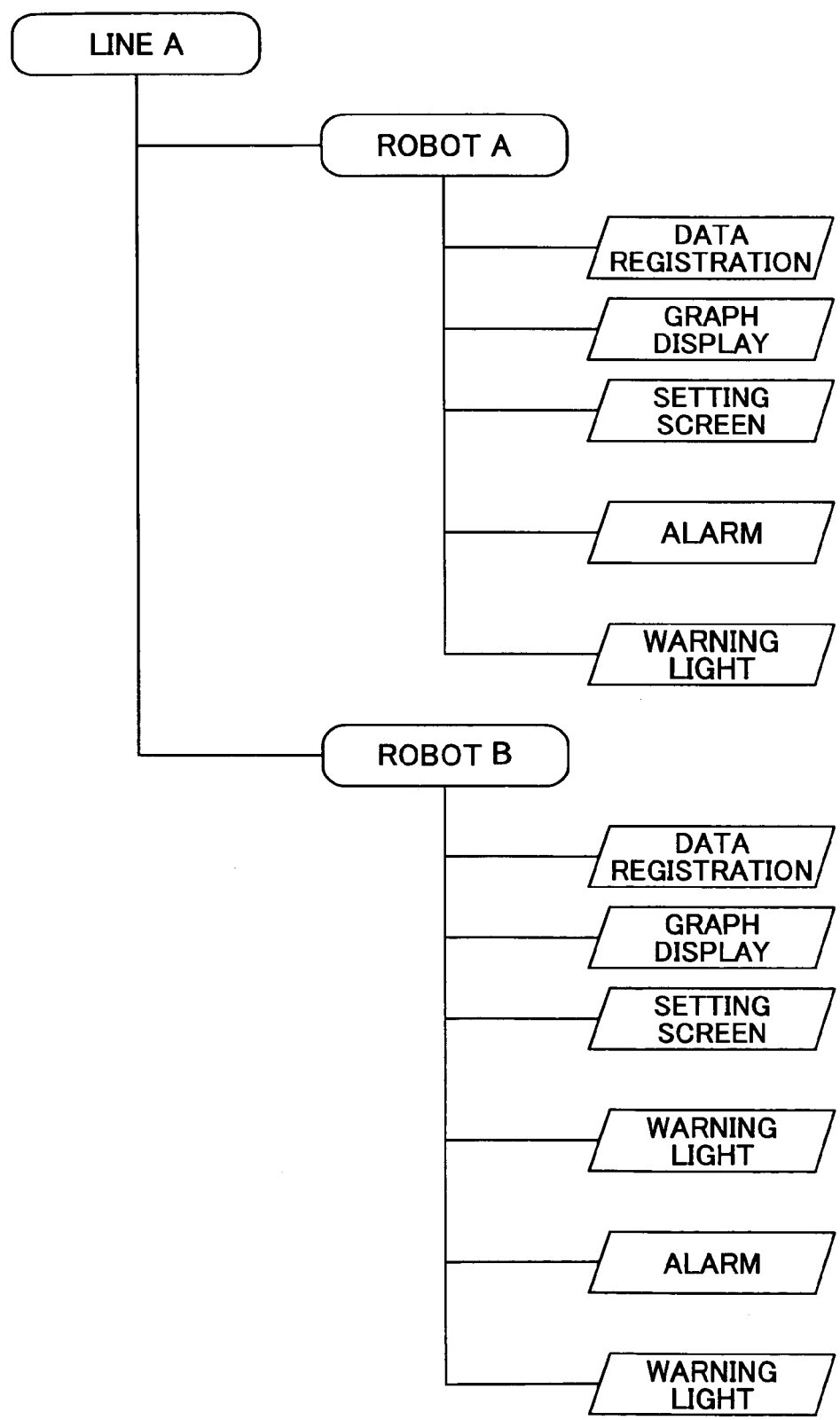
FIG. 11 is a diagram showing cooperative operation (in charge of robot) in an embodiment of the present invention.

Next, for example, a case shown in FIG. 11 is considered in which, when a robot is initially introduced to a line A in a factory, cooperative working is performed at the same time by a robot operator in the factory and a support person in a robot maker existing at a distant place. The robot includes network functions that can send its operation data and can change setting data.

At the general node "line A" (node ID=101) on the management system, the robot operator has authority of node viewing/node change/node execution as shown in FIG. 12. Then, when introducing the robot, "robot A" (node ID: 102) and "robot B" (node ID: 103) are generated as general nodes under the "line A" on the management system. When generating the general node, the general node inherits all user information generated in a general node that is the parent node. FIG. 13 shows an example of a node tree/user information table in the node tree/user information database 111 in this case. An actual entity of the general node is data, for example. An actual entity of the function node is a program for executing a function, for example.

In the present invention, a general node or a function node can be generated under a general node. But, nothing can be generated under a function node. In addition, authority set for a user of a general node is authority for nodes under the general node.

Accordingly, the robot operator generates the general node "robot A" on the management system, generates the function nodes corresponding to network functions of the robot on the management system, and embeds program modules each of which corresponds to each function and operates according to authority of the user in the general node.

In this example, program modules to be embedded are: a <data registration> function node (node ID: 104) for registering operation data of the robot in each time into a table, shown in FIG. 14, that is generated for each general node in the node tree/user information database 111; a <graph display> function node for displaying data stored in the table of the general node on a time-series graph; a <setting screen> function node for displaying and setting a setting screen of the robot, and the like.

In such management system, when the robot operator and the support person, of the robot maker, who is an outsider performs cooperative work, tables in the node tree/user information database 111 are set as shown in FIGS. 15 and 16. As authority for a new registered user, authority of the user who performed user registration is inherited as a default.

By performing such settings, the robot maker support can know, even from a distant place, information such as the graph based on the operation data registered by the robot operator or the robot data sending apparatus manager, so that the robot maker support can instruct operation settings and precise adjustments when initially introducing the robot. However, although the robot maker support can access data of the "robot A" and "robot B" and can execute the function node, the robot maker support cannot perform operations such as data change for a node and registration/deletion for user/node.

Figure 17:
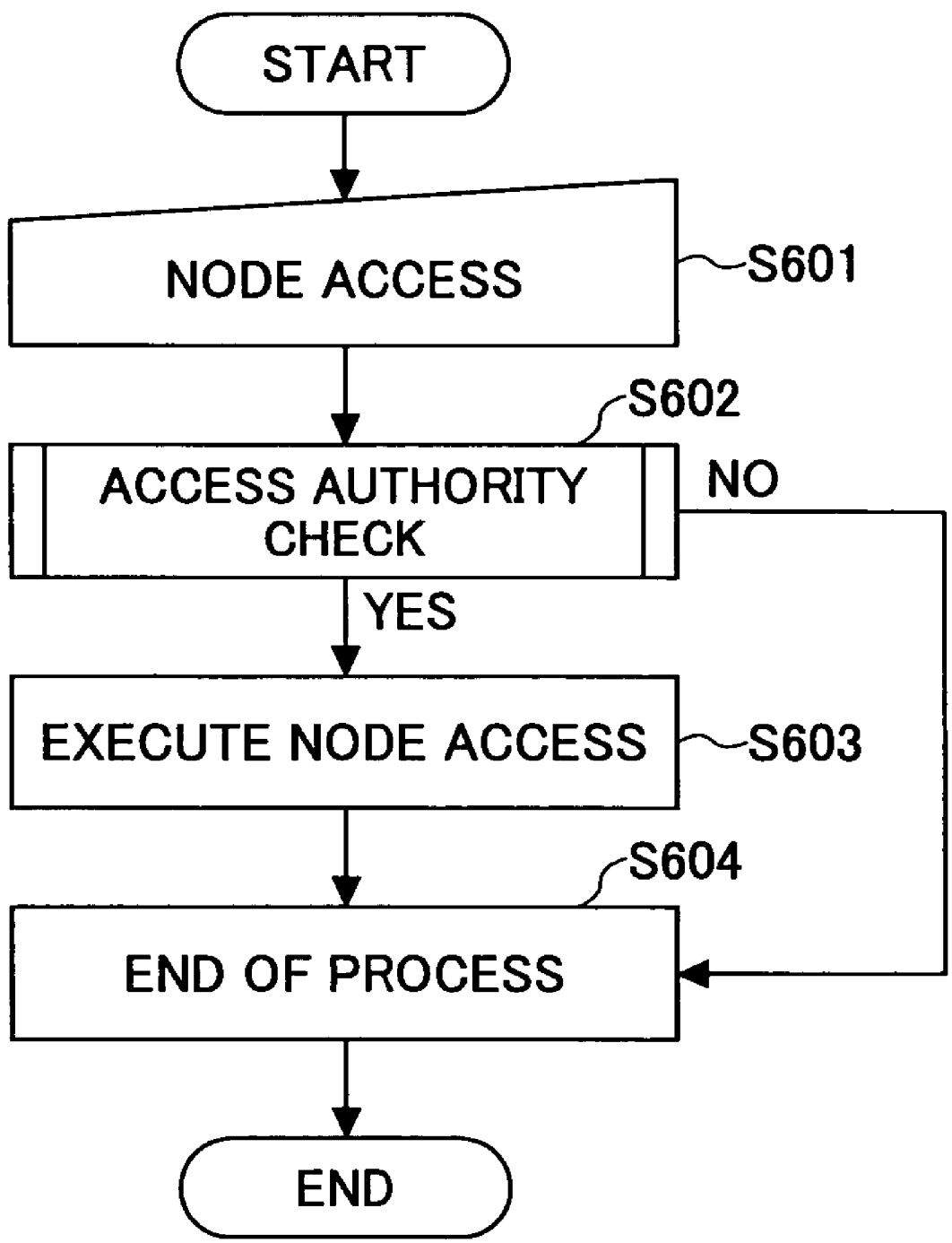
FIG. 17 is a flowchart showing node access/function node execution in an embodiment of the present invention.

FIG. 17 shows the operation for executing the node access/function.

When a node is accessed via the access management interface 152 (step 601), the authority determination unit 153 refers to information of the management information database 112 (step 602), and executes node access when there is access authority (step 603).

That is, by referring to the operation data, graph and the setting screen of the registered robot, the robot maker support can issue instructions to the robot operator, so that the robot operator can change setting based on the robot maker support. However, the robot maker support cannot know configurations and other information of general nodes and function nodes other than necessary parts such as the whole configuration of the factory=configuration of general nodes, other than "line A". The robot maker support can view only information under the general node "line A", and the robot maker support cannot view nodes other than nodes under the "line A" if the robot maker support does not have authority even when other nodes exist in the management system. Therefore, according to supply of functions and management of authority by the management system, compatibility between execution of functions and ability of concealment of important information such as configuration and size of the line can be retained.

In addition, in this example, as shown in FIG. 15, an unregistered user that does not have any authority in a corresponding node does not have any authority at the "line A". In addition, as shown in FIG. 16, at the "robot A", the user only has authority of viewing.

The present invention includes a message function for cooperating among a human and functions of the system. In the following, the message function is described.

Figure 18:
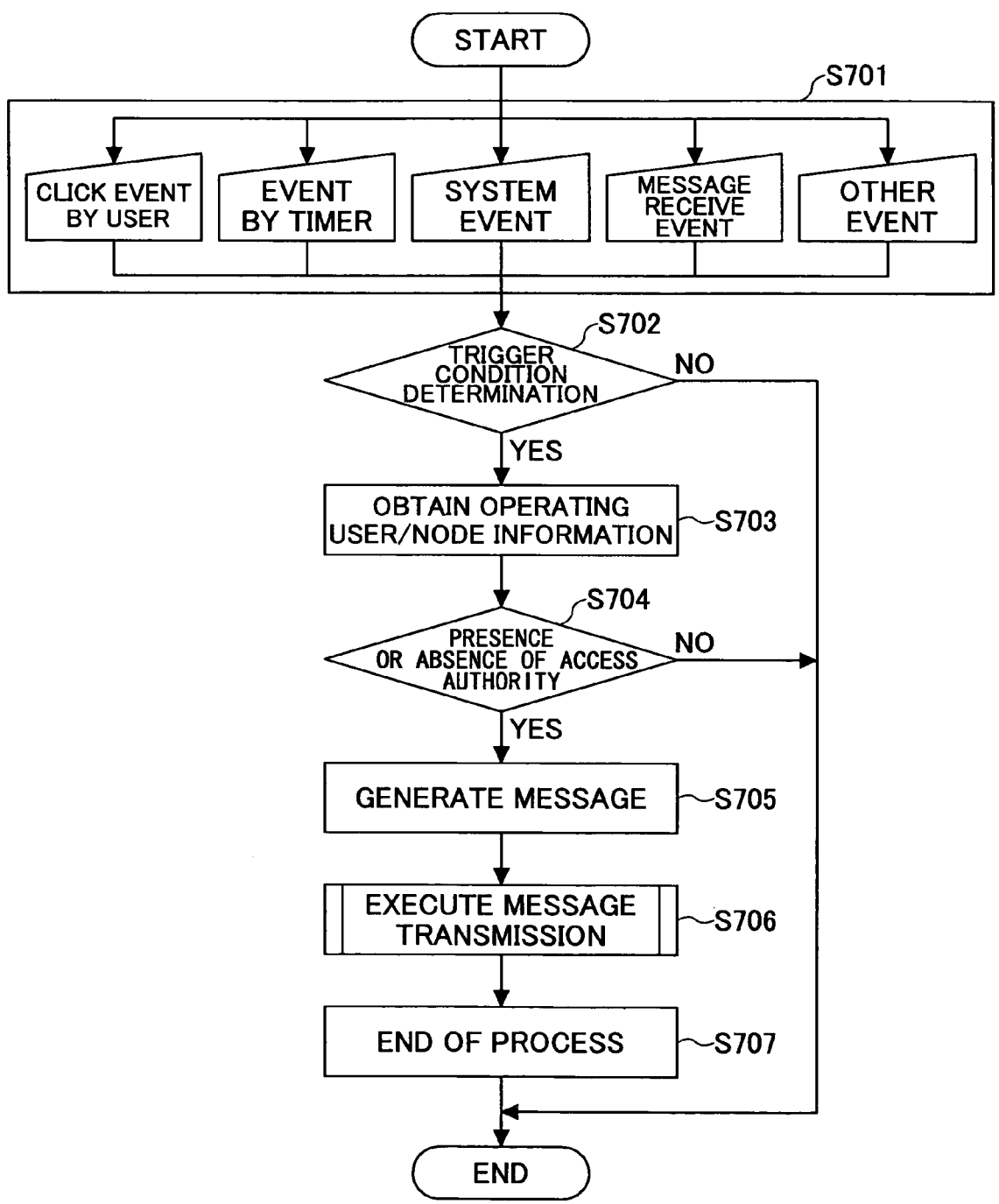
FIG. 18 is a flowchart of message sending in an embodiment of the present invention.
Figure 19:
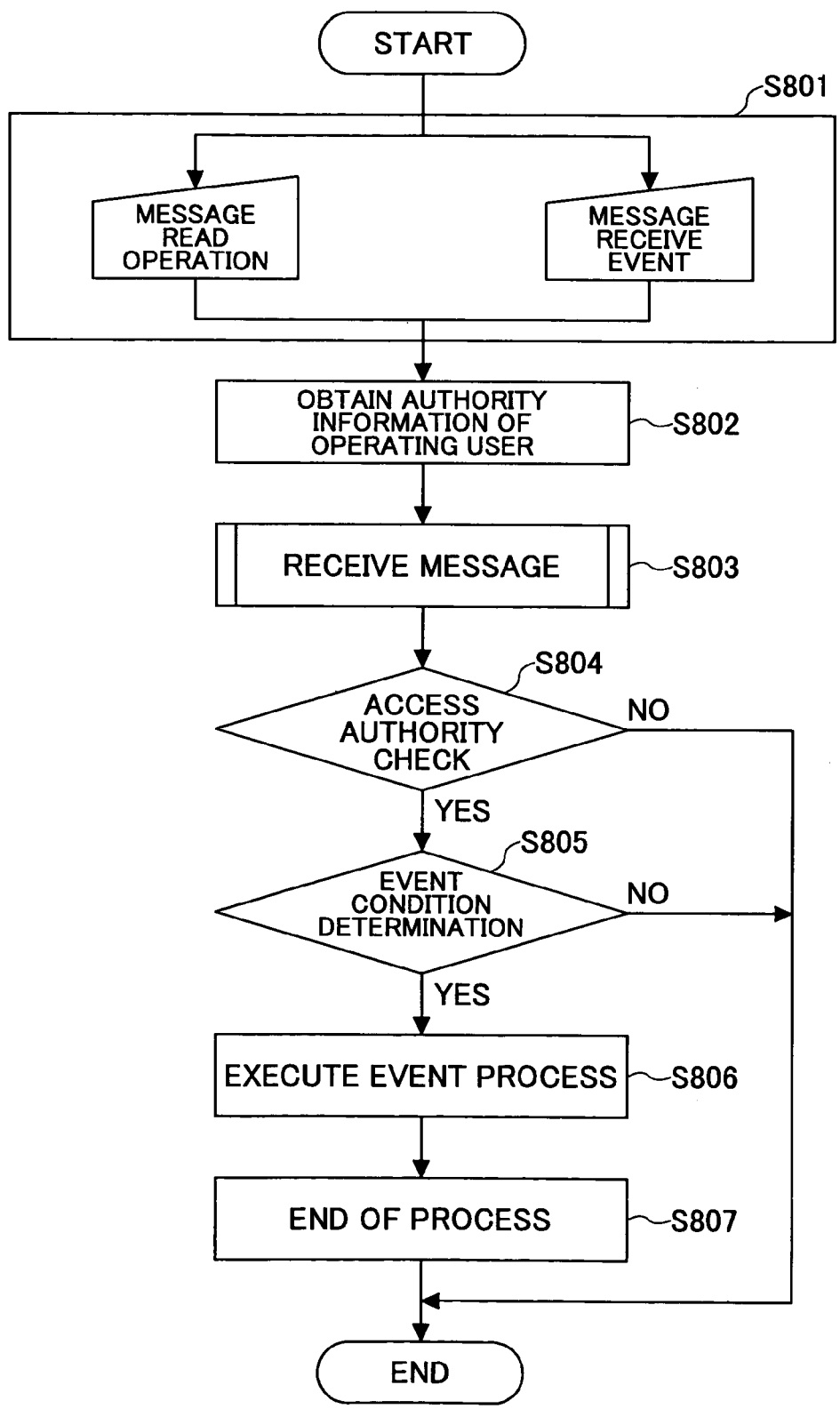
FIG. 19 is a flowchart of message receiving in an embodiment of the present invention.

Sending and receiving of the message are performed by the message management unit 130 according to operations shown in FIGS. 18 and 19.

Operations for sending are described according to FIG. 18.

In the sending event flow, the event management unit 170 detects a sending event (step 701. Then, a trigger condition for message sending set by the event trigger setting unit 136 beforehand is checked (step 702). If the condition is satisfied, processing for message sending starts. First, the message sending unit 135 obtains information of the source user information or node information (step 703), then determines whether it has an access authority for the sending destination (step 704). If it has the access right, the message sending unit 135 performs message generation process (step 705). When the message is generated, message sending process is performed. In the message sending process, the message sending unit 135 obtains the information of the sending destination user or node information. Then, if the information is registered in the access list 133 of the sending destination, the message sending unit 135 actually sends the message (step 706). In the process, the registration check for the sending destination access list can be omitted.

Next, operations for receiving are described with reference to FIG. 19.

In the event flow for receiving a message, when the message arrives (step 801), authority information of the operation user or the node is obtained (step 802), and the message receiving unit 134 performs message receiving process (step 803). In the message receiving process, the message receiving unit 134 checks access authority for the sending origination user or function node, and access authority for the receiving user or node (step 804). After receiving the message, when a process event for the message is set (step 805), presence or absence of the event is checked, and individual process is performed as necessary (step 806). After that, the process ends (step 807).

Figure 20:
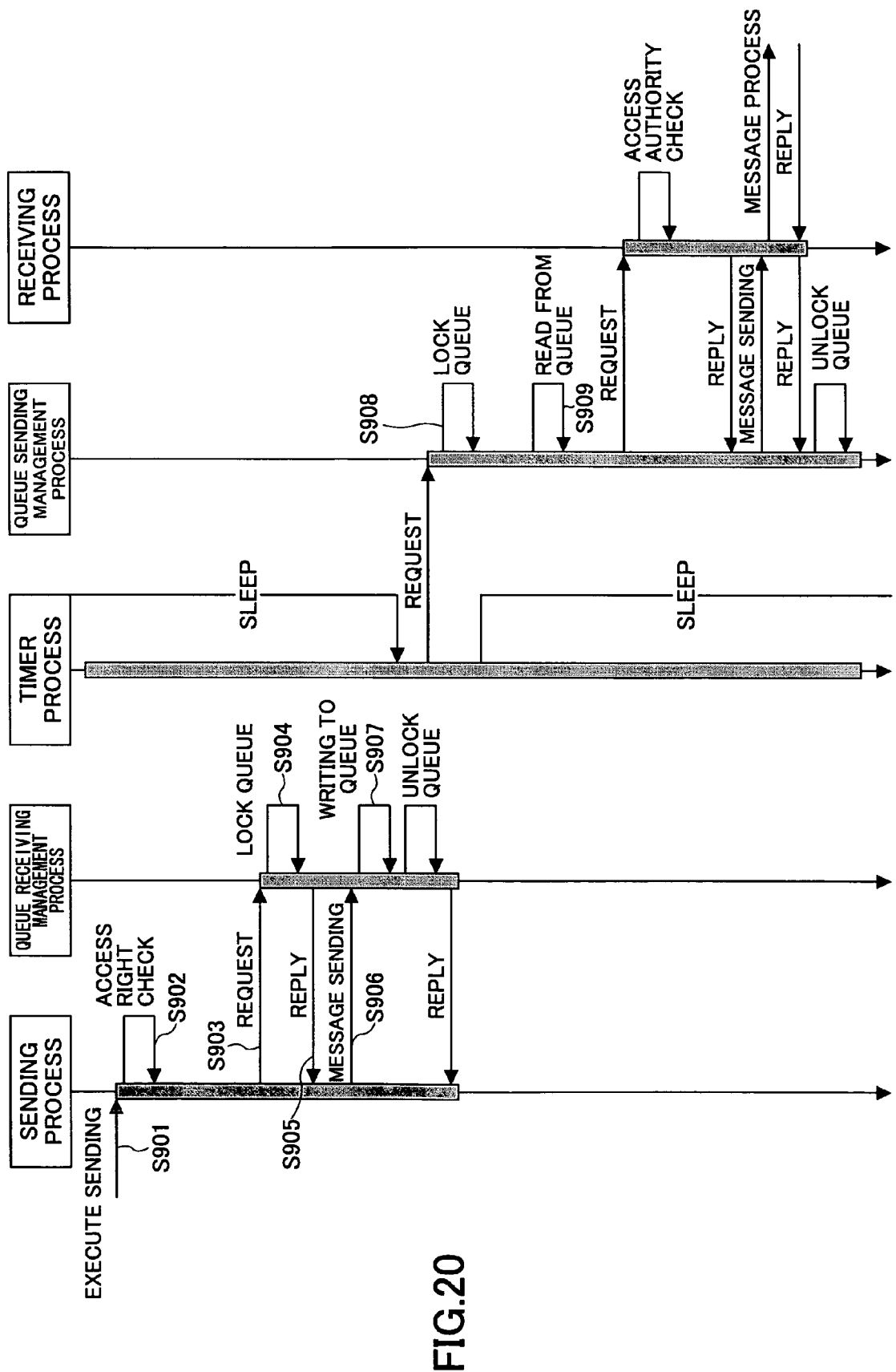
FIG. 20 is a diagram (1) showing an asynchronous message process (no sort, no access list) in an embodiment of the present invention.

In the following, processes when the message function (message sending unit, message receiving unit) performs asynchronous process are described with reference to FIG. 20.

When a user or a function node sends a request for message sending (step 901), a sending process (message sending unit) launches, and checks access authority for accessing a node of the sending destination (step 902). When the access authority is set, the following sending process continues.

For performing asynchronous communication, the request is temporarily stored in a queue of the queue management unit 132. The sending process accesses the queue receiving management process (queue management unit 132) (step 903).

First, the queue receiving management process performs exclusive control by locking the queue (step 904). After completing the lock by the queue receiving management process, the queue receiving management process sends a reply reporting completion of message receiving preparation (step 905). The sending process sends a message to the queue receiving management process (queue management unit 132) (step 906), and the queue receiving management process stores the received message in the queue (step 907).

Figure 21:
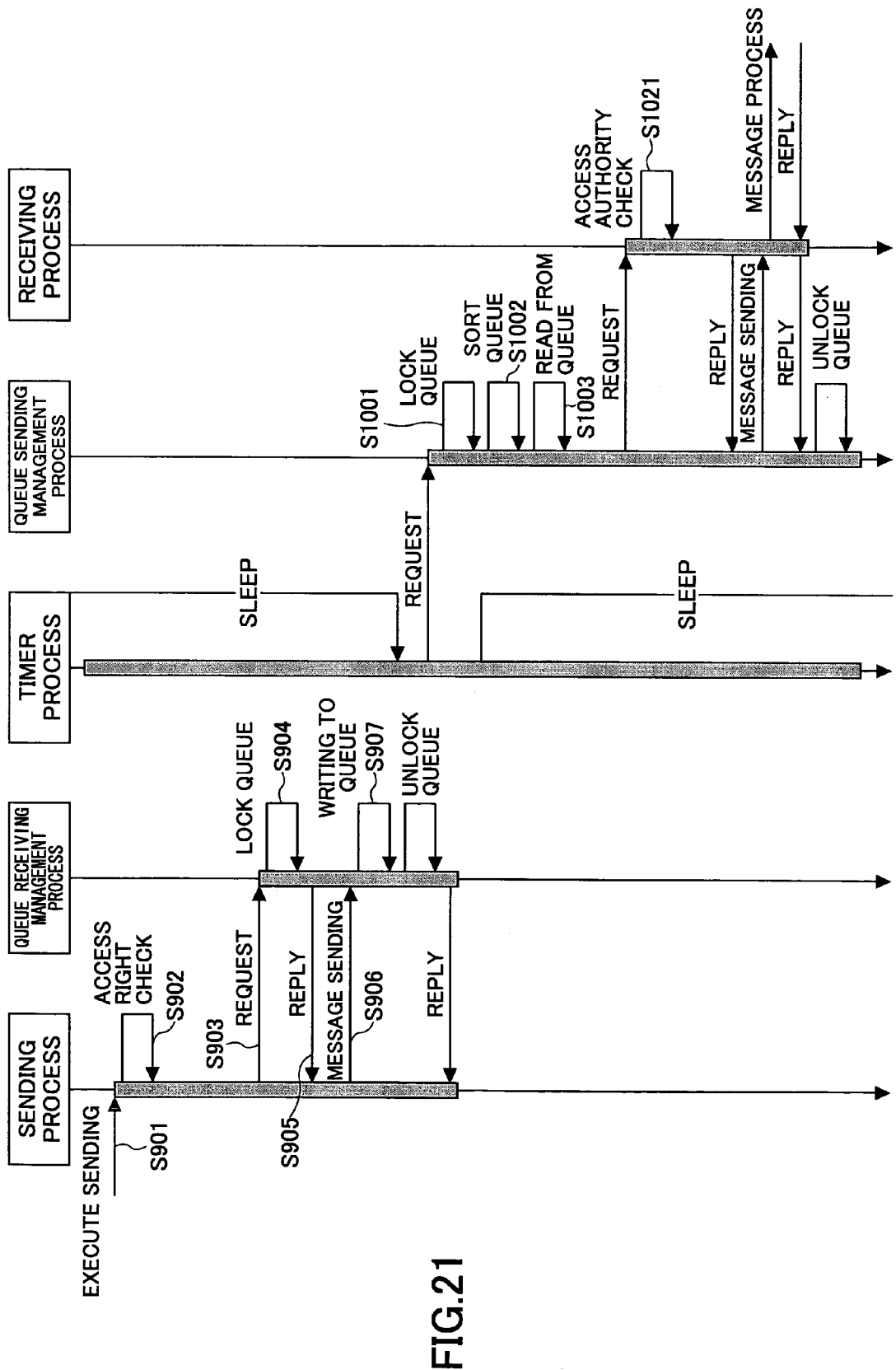
FIG. 21 is a diagram (2) showing an asynchronous message process (no sort, no access list) in an embodiment of the present invention.

The message stored in the queue is read by a queue sending management process that is periodically launched after the queue is locked (step 908). At this time, in general processing, messages are read in an order that the messages were written (step 909). However, when priority is set for the message by the priority setting unit 137, for example, messages are sorted based on items (step 1002) as shown in FIG. 21, and read (step 1003). Thus, the messages can be sent in the sorted order.

The message received in such a way is passed from the receiving process (message receiving unit 134) to a process according to a receiving destination such as a user, node and the like. After corresponding processing is performed, the process ends.

Although a case where the asynchronous process is used as the message function is described in this example, it is possible that the sending process (message sending unit 135) and the receiving process (message receiving unit 134) directly exchange a message without a queue.

In addition, although it is assumed that the queue of the message is generated for each management system for the sake of simplicity in this example, it is also possible that the queue is provided for each general node by dividing the management unit into smaller units so that management for a message to a user registered in a general node or to a function node can be performed, and it is also possible that the queue is provided for each user or each function node.

Figure 22:
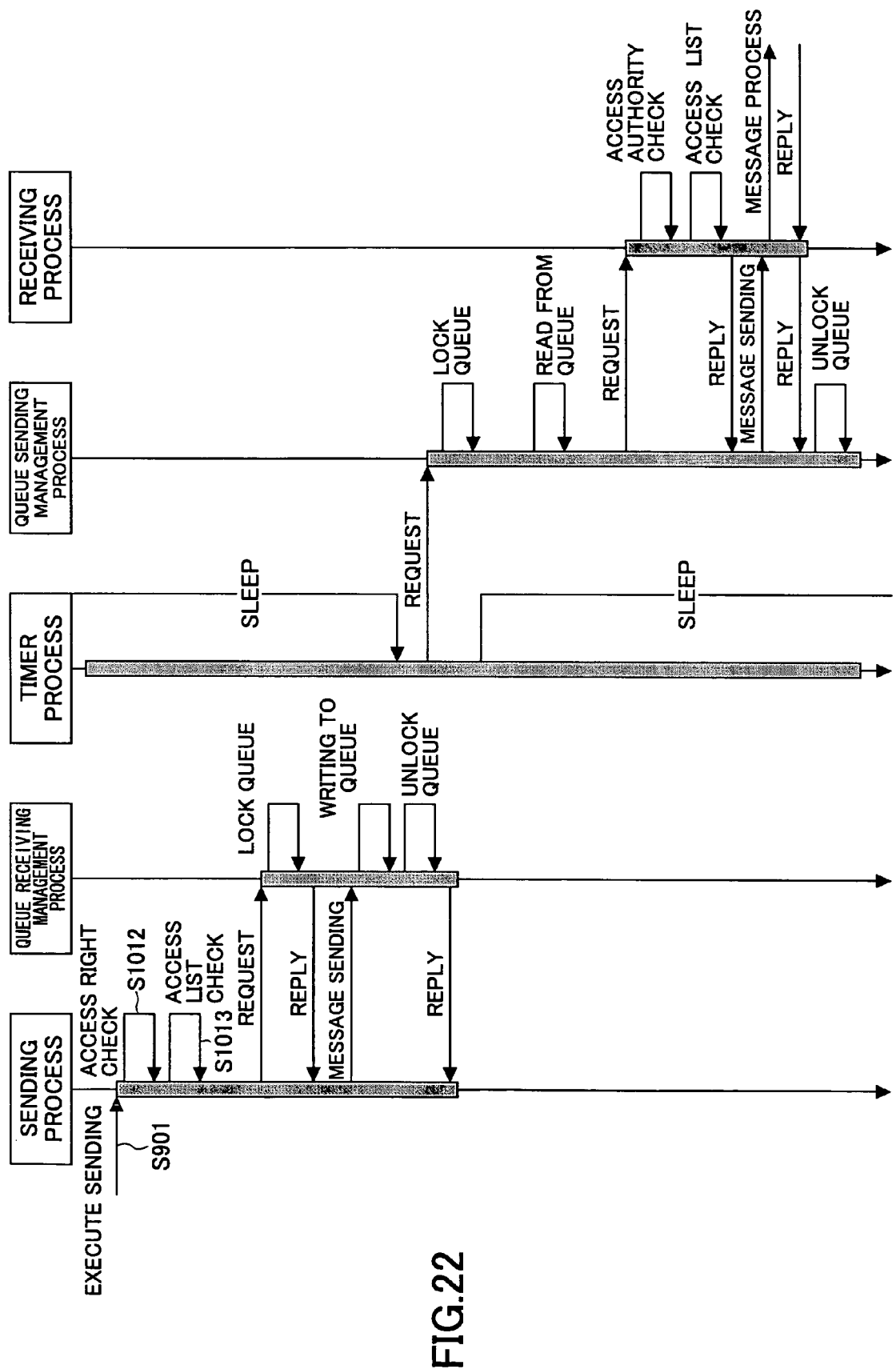
FIG. 22 is a diagram (1) showing an asynchronous message process (no sort, access list exists) in an embodiment of the present invention.
Figure 23:
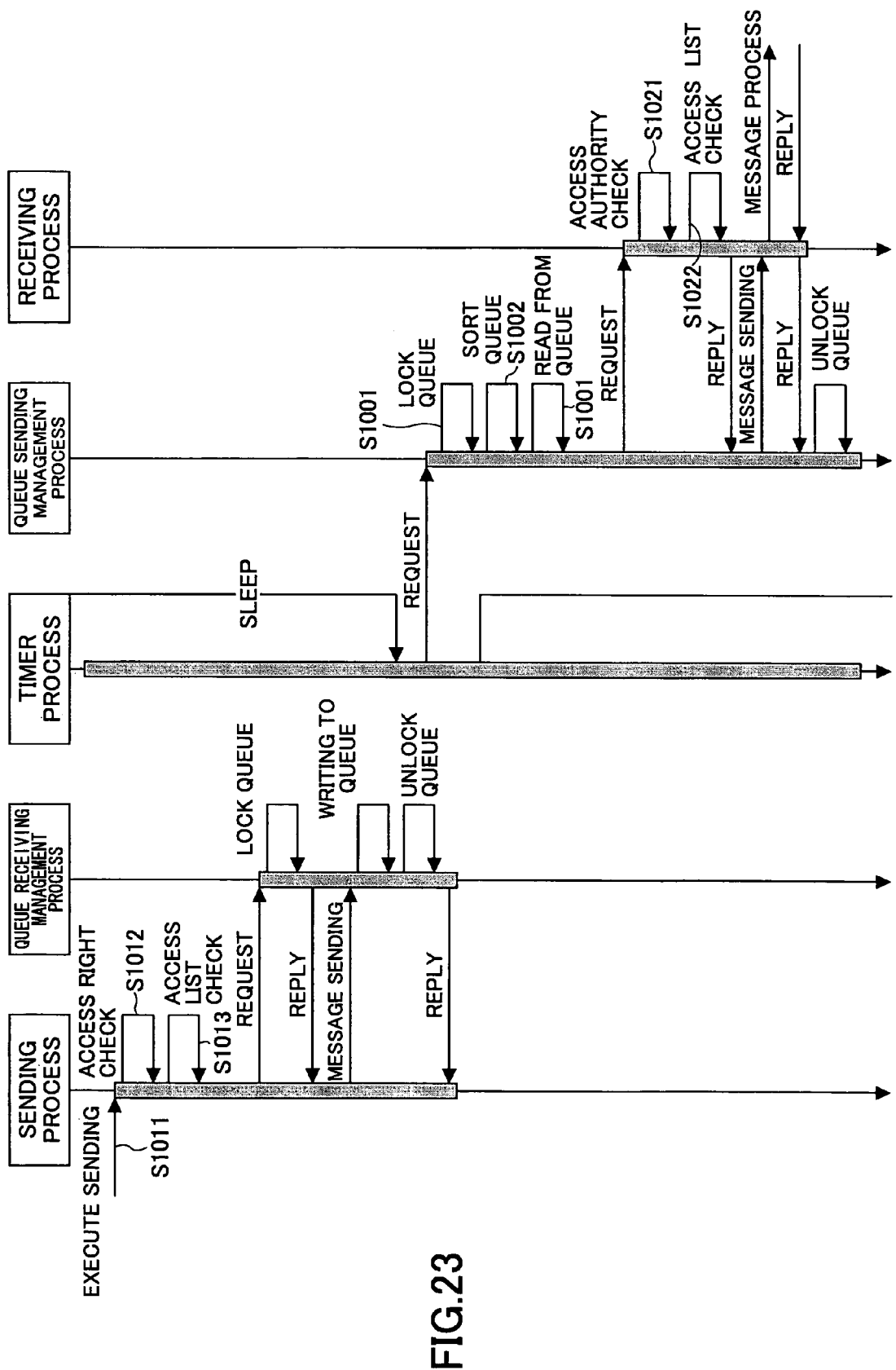
FIG. 23 is a diagram (2) showing an asynchronous message process (no sort, access list exists) in an embodiment of the present invention.

In addition, as to the asynchronous process of the message function, by limiting users and nodes that are sending destinations of the message, an access list 133 for improving security can be set. When setting the access list 133, as shown in FIG. 22, in addition to the processes shown in FIG. 20, processes for checking access authority (step 1012), and checking the access list (step 1013) are added. In addition, when the access list is used with the sorting, as shown in FIG. 23, in addition to the processes shown in FIG. 21, access authority is checked (step 1021) and the access list is checked (step 1022).

Figure 24:
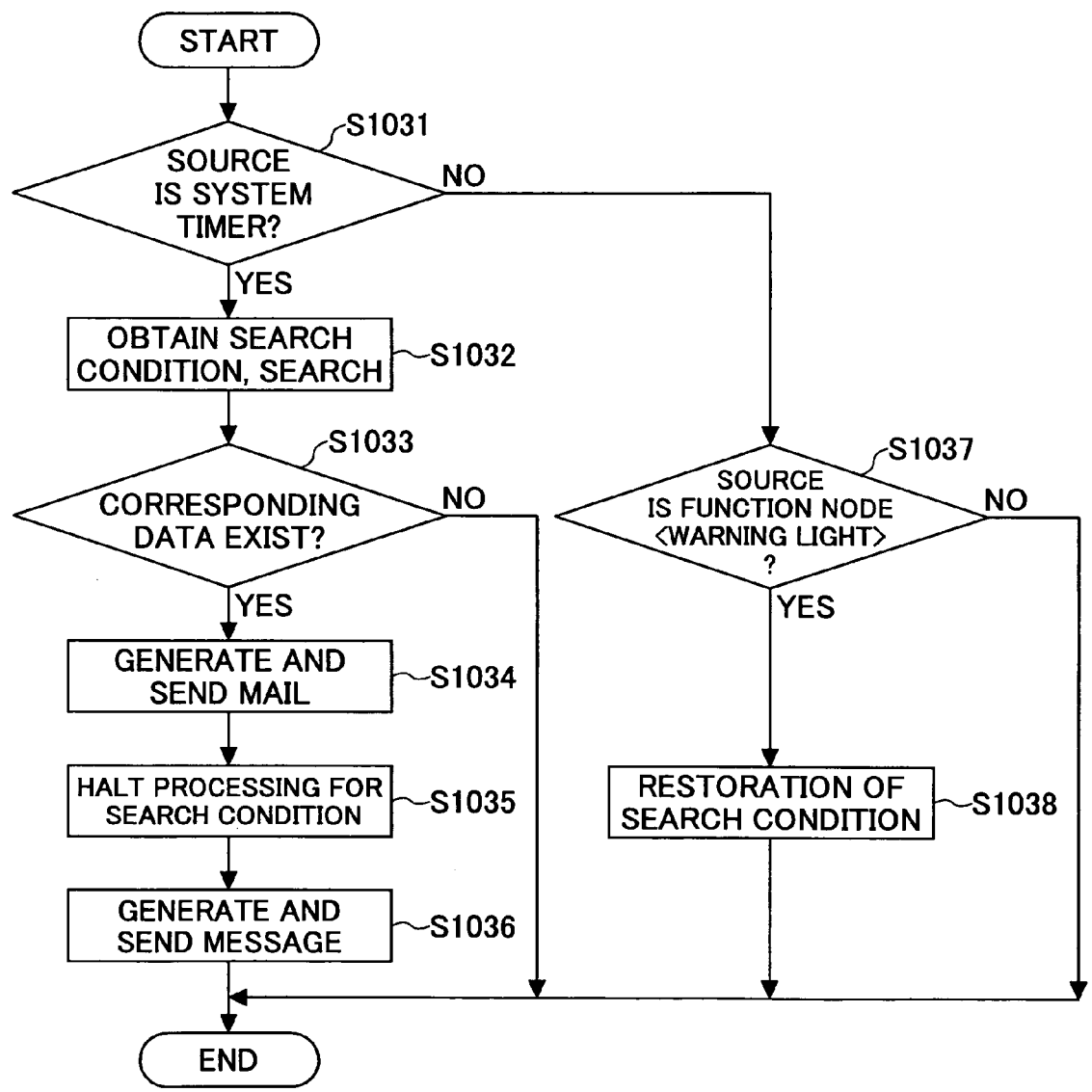
FIG. 24 is a flowchart of function node <alarm> process in an embodiment of the present invention.

In the following, it is considered to perform automatic process using message exchange in the configuration shown in FIG. 11. FIG. 24 shows processes in the function node <alarm>.

In the example shown in before-mentioned FIG. 11, a message received at a constant time interval from the <system timer> function node triggers the <alarm> function node in the "robot A" to start its process (step 1031).

The execution in this case is performed based on authority set in the "robot A" node that is a parent node of the <alarm> function node for the <system timer> function node as shown in FIG. 16.

As a concrete alarm process, a search is performed for data, within a predetermined time, in information on the "robot A" stored in the table (FIG. 14) of the node tree/user information data base 111 in the management system based on a predetermined condition such as that the arm joint angle is equal to or greater than 15 degrees (step 1032). In this case, when there is data that matches with the condition (step 1033), the system determines that abnormality occurs, and a mail reporting that the abnormality occurs is sent to a predetermined mail address (step 1034), and the condition by which the abnormality is detected is temporarily excluded from search conditions (step 1035). Next, the <alarm> function node sends, to the <warning light> function node, a message including a node ID of the return destination, the search condition by which the abnormality was detected, and the own node ID of the origination or a name of the own node, and the process ends (step 1036).

Figure 25:
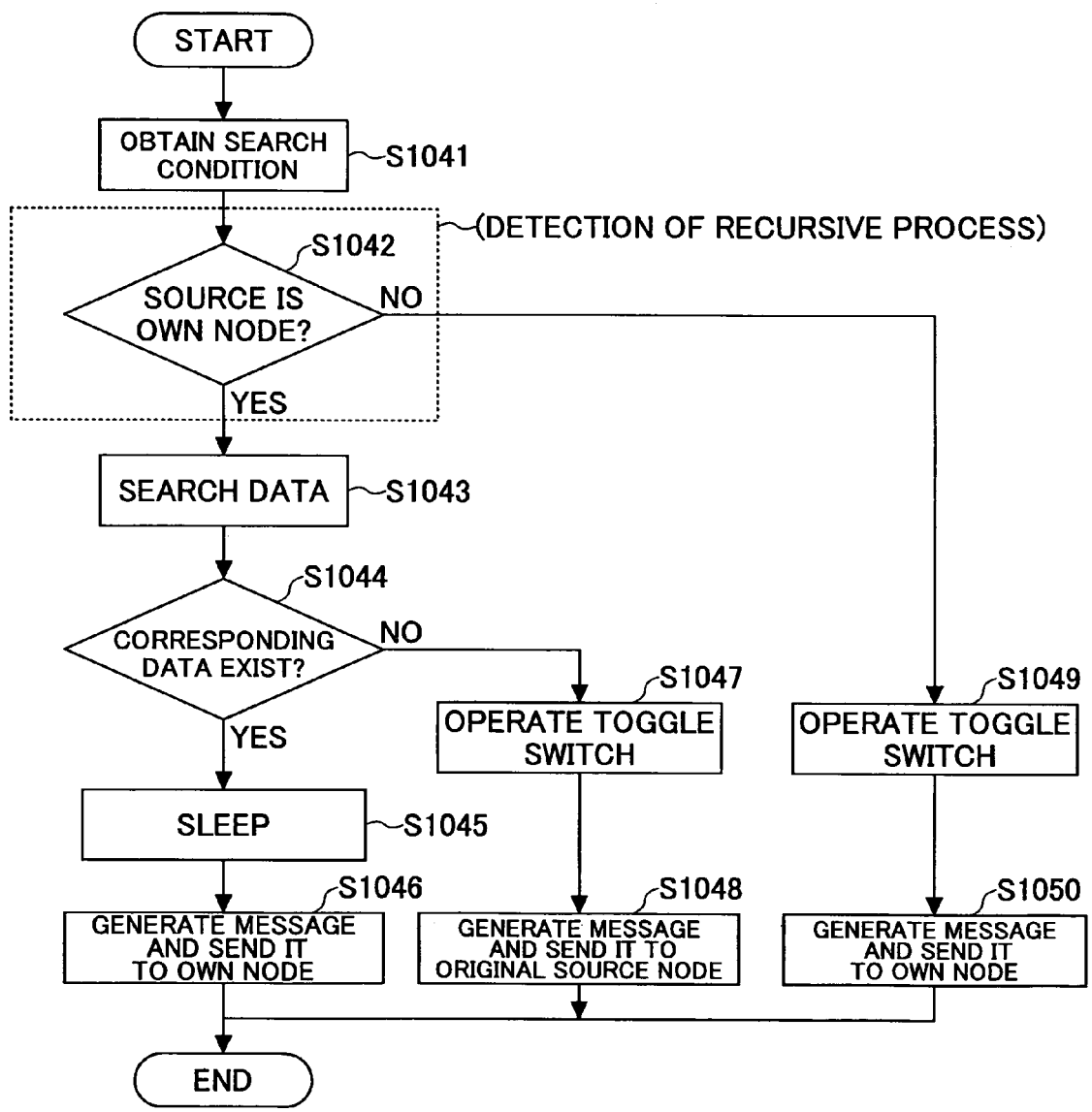
FIG. 25 is a flowchart of function node <warning light> process in an embodiment of the present invention.

Receipt of the message triggers the <warning light> function node to search data within a predetermined time using the search condition included in the message as shown in FIG. 25 (step 1041). First, since the sending origination is not the own node (No in step 1042), the function node sends a signal to a toggle switch of the warning light that is connected to the management system and that is placed near the robot A of the line A to cause the warning light on (step 1049), so as to notifying of the occurrence of the abnormality event. The <warning light> function node sends the received message as it is to the <warning light> function node itself, and the process ends (step 1050).

Next, in step 1042, since the sending origination of the message is the own node, when abnormal data is detected (step 1043, step 1044), after halting for equal to or more than a predetermined time (step 1045), the <warning light> function node sends the receives message as it is to the <warning light> function node itself, and the process ends (step 1046).

Accordingly, the <warning light> function node recursively repeats the search process for data in the own node until abnormal data is eliminated. After abnormal data is eliminated, the <warning light> function node operates the toggle switch to turn off (step 1047), obtains information of the <alarm> function node that is the sending origination of the message from the message, and sends the received search condition to the <alarm> function node as a message (step 1048).

In FIG. 24, when the <alarm> function node receives the message from the <warning light> function node, the <alarm> function node restores the search condition that was temporarily excluded, and performs monitoring again (steps 1037, 1038). The processing of the steps 1031-1033 and 1037 in FIG. 24 roughly corresponds to the event condition determination process in FIGS. 18 and 19, and the processing of the steps 1034-1036 and 1038 in FIG. 24 roughly corresponds to the event execution process in FIGS. 18 and 19. In addition, the processing of the steps 1041-1044 in FIG. 25 roughly corresponds to the event condition determination process in FIGS. 18 and 19, and the processing of the steps 1045-1050 in FIG. 25 roughly corresponds to the event execution process in FIGS. 18 and 19.

Each process in the system management apparatus in the above-mentioned embodiment can be realized by executing a program on a computer. The program is executed by a control means such as a CPU and the like.

In addition, the above-mentioned series of processes can be performed successively by executing a program for performing a series of processes of user registration, node number assignment, node setting, authority setting, process execution with a process of inquiry to the user.

The program of the present invention can be distributed by storing it in a recording medium such as a flexible disk and a CD-ROM. In addition, the present invention can be used for management for resources for apparatuses in an organization such as a company.

The present invention is not limited to the specifically disclosed embodiments, and variations and modifications may be made without departing from the scope of the invention.

The invention claimed is:

1. A system management method performed at a system management apparatus for associating at least a process object and at least a process that should be executed for each process object with each node in a tree structure, and operating each node based on the tree structure so as to manage the process object and the process, comprising:

a user registration step of storing, in a database, a user ID to be uniquely assigned to each registered user that performs operations for a node;

a node setting step, performed at a processor of the system management apparatus, of providing a general node corresponding to the process object and a function node that is a program for performing a process, setting the function node as a child node of the general node corresponding to the process object for which the process corresponding to the function node should be performed, and setting the general node as a parent node of the function node, and storing information of the set child node into the database by associating the information with the general node that is the parent node;

an authority setting step, performed at the processor of the system management apparatus, of setting registered user operation authority of each user ID for each of the general nodes, and storing the registered user operation authority into the database by associating the registered user operation authority with the general node, and setting, function node operation authority for each of function nodes, and storing the function node operation authority in the database by associating the function node operation authority with the general node;

a process execution step, performed at the processor of the system management apparatus, of, when execution of the process corresponding to the function node is requested by the registered user, causing the function node to execute the process only when the process is permitted by the registered user operation authority, of the registered user requesting the process, set in the general node that is a parent node of the function node when execution of the process corresponding to the function node is requested by any function nodes, causing the function node to execute the process only when the process is permitted by the function node operation authority, of the function node that requests the process, set for the general node that is the parent node of the function node;

setting, at the processor of the system management apparatus, for each general node, non-registered user operation authority that is operation authority of a non-registered user and storing the non-registered user operation authority in the database by associating the non-registered user operation authority with the general node; and causing, at the processor of the system management apparatus, the function node to execute the process only when the process is permitted by the non-registered user operation authority set for the general node that is the parent node of the function node, when execution of the process corresponding to the function node is requested by the non-registered user.

2. The system management method as claimed in claim 1, comprising:

setting, for each of the general nodes, function node operation authority for each function node, and storing the function node operation authority in the database by associating the function node operation authority with the general node; and causing the function node to execute the process only when the process is permitted by the function node operation authority, of the function node that requests the process, set for the general node that is the parent node of the function node when execution of the process corresponding to the function node is requested by any of function nodes.

3. The system management method as claimed in claim 1, comprising:

sending a message in which at least any one of the function node or the user is a sending origination and at least any one of function nodes is a destination, detecting presence or absence of execution of a predetermined event process at the sending origination, and sending the message received from the sending origination according to the detection result; and receiving the message to the destination, when receiving the message, sending a message having the destination as a sending origination to the destination or causing the destination to execute a predetermined event process according to a condition that is set beforehand.

4. The system management method as claimed in claim 3, comprising:

sending and receiving an asynchronous message using a queue that temporarily stores the message.

5. The system management method as claimed in claim 4, comprising:

sending or receiving the asynchronous message according to a priority set for each message when sending or receiving the asynchronous message.

6. The system management method as claimed in claim 3, comprising:

determining whether the received message is a recursive message from the own node based on sending origination information of the message, and recursively performing message sending or the event process based on the sending origination information of the message when the message is the recursive message from the own node.

7. The system management method as claimed in claim 3, comprising:

receiving only a message sent from a sending origination set in a predetermined access list.

8. A system management apparatus for associating at least a process object and at least a process executed for each process object with each node in a tree structure, and operating each node based on the tree structure so as to manage the process object and the process, comprising:

a processor in communication with a database configured to store each piece of information of a general node corresponding to the process object, a function node corresponding to the process, and a registered user for operating the general node or the function node;

the processor configured to performing a process for registering a user ID to be uniquely assigned to each registered user and storing the user ID in the database;

the processor configured to uniquely assigning a node number to each of the general node and the function node, and storing the node number in the database by associating the node number with the general node or the function node;

the processor configured to set the function node as a child node of the general node corresponding to the process object for which the process corresponding to the function node should be performed, and setting the general node as a parent node of the function node, and storing information of the set child node into the database by associating the information with the general node that is the parent node;

the processor configured to set registered user operation authority for each registered user for each of the general nodes, and storing the registered user operation authority into the database by associating the registered user operation authority with the general node;

the processor configured to, when execution of the process corresponding to the function node is requested by the registered user, causing the function node to execute the process only when the process is permitted by the registered user operation authority, of the registered user requesting the process, set in the general node that is a parent node of the function node, the processor configured to provide a registered user in a general node with registered user operation authority including management authority for performing user registration for a predetermined node, and permits the registered user to set registered user operation authority for other registered user within a limit of the registered user operation authority of the registered user, the processor configured to set for each general node, non-registered user operation authority that is operation authority of a non-registered user that is not registered by the processor, and storing the non-registered user operation authority in the database by associating the non-registered user operation authority with the general node, and the processor configured to, when execution of the process corresponding to the function node is requested by the non-registered user, causing the function node to execute the process only when the process is permitted by the non-registered user operation authority set for the general node that is the parent node of the function node.

9. The system management apparatus as claimed in claim 8, wherein:

the processor further setting, for each of the general nodes, function node operation authority for each function node, and storing the function node operation authority in the database by associating the function node operation authority with the general node; and the processor configured to, when execution of the process corresponding to the function node is requested by any of the function nodes, cause the function node to execute the process only when the process is permitted by the function node operation authority, of the function node that requests the process, set for the general node that is the parent node of the function node.

10. The system management apparatus as claimed in claim 8, comprising:

the processor configured to send a message in which at least any one of the function node or the user is a sending origination and at least any one of function nodes is a destination;

receive the message to the destination, detect presence or absence of execution of a predetermined event process at the sending origination, and sending the message received from the sending origination according to the detection result, and when receiving the message, send a message having the destination as a sending origination to the destination or causing the destination to execute a predetermined event process according to a condition that is set beforehand.

11. The system management apparatus as claimed in claim 10, wherein:

the processor is configured to send and receive an asynchronous message using a queue that temporarily stores the message.

12. The system management apparatus as claimed in claim 11, wherein:

the processor is configured to send and receive according to a priority set for each message when sending or receiving the asynchronous message.

13. The system management apparatus as claimed in claim 10, wherein the processor is configured to:

when receiving the message, determine whether the message is a recursive message from the own node based on sending origination information of the message; and recursively perform message sending or the event process based on the sending origination information of the message when the message is the recursive message from the own node.

14. The system management apparatus as claimed in claim 10, wherein the processor is configured to receive only a message sent from a sending origination set in a predetermined access list.

15. A computer-readable recording medium including a program, which when executed by a computer causes the computer to perform a method for associating at least a process object and at least a process executed for each process object with each node in a tree structure, and operating each node based on the tree structure so as to manage the process object and the process, the method comprising:

registering a user ID to be uniquely assigned to each registered user that performs operations for a general node corresponding to the process object or for a function node corresponding to the process, and storing the user ID in a database;

uniquely assigning a node number to each of the general node and the function node, and storing the node number in the database by associating the node number with the general node or the function node;

setting the function node as a child node of the general node corresponding to the process object for which the process corresponding to the function node should be performed, and setting the general node as a parent node of the function node, and storing information of the set child node into the database by associating the information with the general node that is the parent node;

setting registered user operation authority for each registered user for each of the general nodes, and storing the registered user operation authority into the database by associating the registered user operation authority with the general node;

causing the function node to execute the process only when the process is permitted by the registered user operation authority, of the registered user requesting the process, set in the general node that is a parent node of the function node, when execution of the process corresponding to the function node is requested by the registered user;

providing a registered user in a general node with registered user operation authority including management authority for performing user registration for a predetermined node, and permitting the registered user to set registered user operation authority for other registered user within a limit of the registered user operation authority of the registered user;

setting, for each general node, non-registered user operation authority that is operation authority of a non-registered user and storing the non-registered user operation authority in the database by associating the non-registered user operation authority with the general node; and causing the function node to execute the process only when the process is permitted by the non-registered user operation authority set for the general node that is the parent node of the function node, when execution of the process corresponding to the function node is requested by the non-registered user.

* * * * *